United States Patent
Wathes et al.

[11] Patent Number: 5,853,320
[45] Date of Patent: Dec. 29, 1998

[54] PLUCKING APPARATUS FOR POULTRY

[75] Inventors: Christopher Michael Wathes, Royston; David Bernard Tinker, Ampthill; Colin Gibson, Clifton, all of England

[73] Assignee: British Technology Group Limited, London, England

[21] Appl. No.: 646,285

[22] PCT Filed: Nov. 25, 1994

[86] PCT No.: PCT/GB94/02585

§ 371 Date: May 10, 1996

§ 102(e) Date: May 10, 1996

[87] PCT Pub. No.: WO95/14387

PCT Pub. Date: Jun. 1, 1995

[30] Foreign Application Priority Data

Nov. 26, 1993 [GB] United Kingdom .................... 9324342
Jun. 16, 1994 [GB] United Kingdom .................... 9412089

[51] Int. Cl.⁶ .................................................. A22C 21/02
[52] U.S. Cl. .................................. 452/88; 452/89; 452/92
[58] Field of Search ................................. 452/88, 87, 89, 452/90, 91, 92

[56] References Cited

U.S. PATENT DOCUMENTS

| | | |
|---|---|---|
| 1,755,665 | 4/1930 | Richards . |
| 2,743,477 | 5/1956 | Barker et al. . |
| 2,939,171 | 6/1960 | Corey et al. ............................... 452/92 |
| 3,273,198 | 9/1966 | Tomlinson ................................. 452/91 |
| 3,422,490 | 1/1969 | Zebarth et al. . |
| 3,483,589 | 12/1969 | Smorenburg ............................... 452/91 |
| 3,596,309 | 8/1971 | Vertegaal .................................. 452/89 |
| 3,599,278 | 8/1971 | Crane ....................................... 452/89 |
| 3,670,365 | 6/1972 | Dillon . |
| 3,716,892 | 2/1973 | Miles et al. . |
| 4,514,879 | 5/1985 | Hazenbroek . |

FOREIGN PATENT DOCUMENTS

| | | |
|---|---|---|
| 427 643 | 5/1991 | European Pat. Off. . |
| 1 326 199 | 12/1963 | France . |
| 1388901 | 1/1965 | France . |
| 2 078 283 | 11/1971 | France . |
| 2659529 | 9/1991 | France . |
| 2677523 | 12/1992 | France . |
| 2 696 323 | 4/1994 | France . |
| 1 203 610 | 8/1970 | Greece . |
| 7201276 | 8/1973 | Netherlands . |
| 738573 | 6/1980 | U.S.S.R. ................................. 452/88 |
| 786 700 | 11/1957 | United Kingdom . |
| 1 111 781 | 5/1968 | United Kingdom . |
| 94/22316 | 10/1994 | WIPO . |

*Primary Examiner*—Willis Little
*Attorney, Agent, or Firm*—Cushman Darby & Cushman IP Group of Pillsbury Madison & Sutro LLP

[57] ABSTRACT

A plucking unit, apparatus or equipment (25) for plucking poultry carcasses on a shackle line (26) including a plurality of individual plucking units (10), one for each of a number of carcasses to be plucked at any one time, and shielding means (12) included in or provided additionally to, said plucking units (10) whereby the plucking heads of each said unit are shielded from the plucking heads of the neighboring units during plucking.

18 Claims, 15 Drawing Sheets

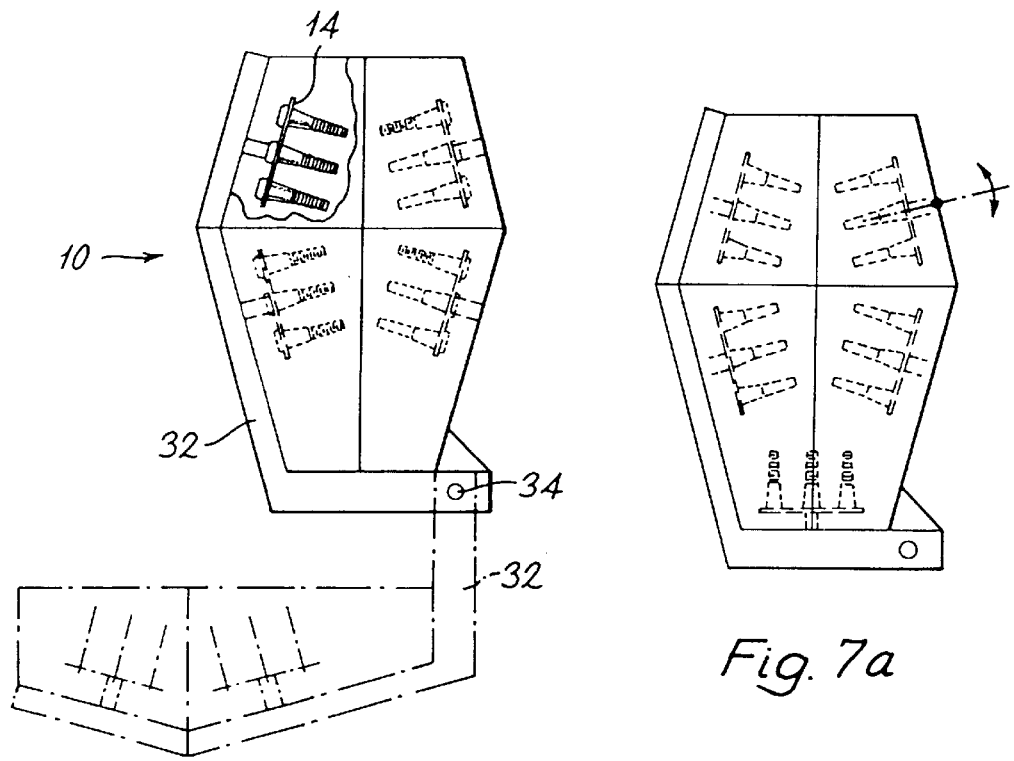
Fig. 7
Fig. 7a
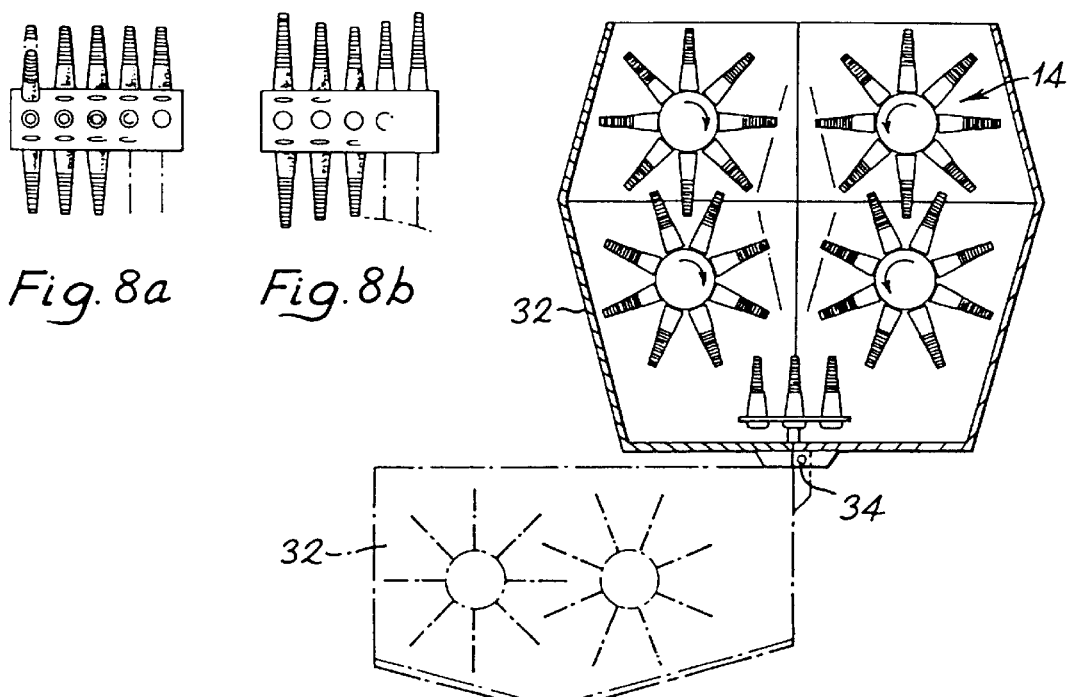
Fig. 8a   Fig. 8b
Fig. 8

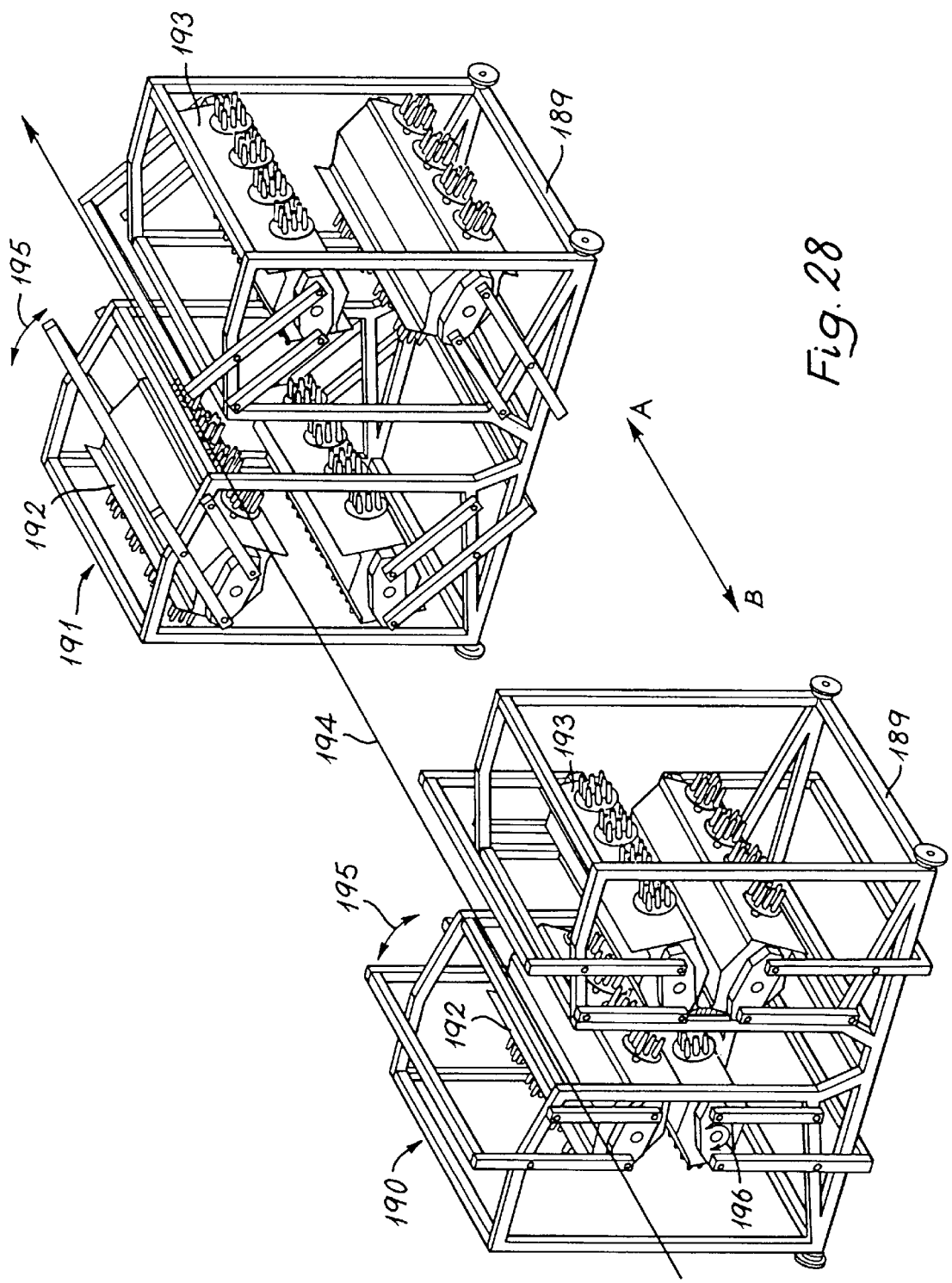

PLUCKING APPARATUS FOR POULTRY

The present invention relates to poultry plucking apparatus and related processing equipment.

In a typical poultry-processing plant, birds are shackled to an overhead conveyor and then, sequentially, pass from equipment which stuns, kills and scalds the birds to plucking equipment which removes the feathers before the carcasses pass on for evisceration and further processing.

Existing plucking equipment uses rubber fingers mounted on rows of contra-rotating discs or drums to rub the feathers off of the birds. These fingers run all the time as the stream of birds pass through the plant at a rate of, typically, 100 to 200 birds per minute.

Although existing plucking equipment is disinfected at the beginning of the day and feathers may be hosed off during meal breaks, significant cross contamination can occur through the rubbing fingers wiping micro-organisms from bird to bird and from micro-organisms colonised on the fingers being deposited onto the birds.

An object of the present invention is to improve the hygiene of plucking equipment in this respect.

According to one aspect of the present invention, poultry processing equipment comprises a shackle line, a plurality of individual plucking units, one for each of a number of carcasses to be plucked at any one time, shielding means included in or provided additionally to said plucking units whereby the plucking heads of each said unit are shielded from the plucking heads of the neighbouring units during plucking, and means for cleaning each of the plucking units between successive plucking operations by that unit.

In some cases, the plucking units will include rotary plucking heads which spin off contaminated water along paths which, unless appropriate steps are taken, would have direct or indirect access to the carcasses on their way to or from the plucking units. Accordingly, in such cases, the shielding means is preferably designed to interrupt these paths so as to shield the carcasses whether at the plucking units or at locations other than the plucking units. Where the shields substantially fully enclose the carcass, the droplets and droplet mists generated by the plucking action on one bird are retained near that bird.

Other aspects of the invention include plucking units for use in said plucking apparatus, and poultry processing equipment including said plucking apparatus and comprising the shackle line and means for cleaning each of the plucking units between successive plucking operations by that unit.

Conveniently, in such equipment, the shackle line operates intermittently e.g. by using a variable pitch shackle chain to obtain a desired intermittent movement of the carcasses, so that the carcasses may be plucked while temporarily halted in their forward motion through the apparatus.

In an alternative arrangement, the shackle line operates continuously and drive means are provided to move the plucking units and the shielding means at the same speed as the carcasses during plucking.

The plucking units will preferably each comprise groups of plucking heads mounted on an associated support.

Conveniently, the plucking heads may be of conventional design, whether of disc and finger or of drum and finger type. As alternatives to drums or discs, the plucking fingers may instead be carried on supports of conical, spherical or other suitable rotation profile.

Conveniently, the plucking heads are arranged to rotate about horizontal, vertical or otherwise inclined axes to achieve the best plucking effect consistent with their position in the apparatus.

As with conventional apparatus, the direction of head rotation is preferably so chosen that wherever practicable, adjacent heads rotate in contrary senses to one another.

In some embodiments of the invention, the supports for the plucking heads provide little or no shielding and adjacent plucking units are then separated by dedicated shielding means which, for convenience of description only, will hereinafter be referred to as "baffles". These baffles may, for example, take the form of vertical sheets spaced apart to separate each plucking unit (and its carcass) from its neighbours.

In other embodiments, the supports for the plucking heads also serve as shielding means and where, in such cases, the supports are adapted during the plucking operation to encircle or mostly encircle the associated carcass when viewed from above, they will be referred to as "bins".

Bins which are circumferentially continuous so as to be able to wholly encircle a carcass will be referred to as "360°" bins while bins which only mostly encircle a carcass because they are circumferentially discontinuous will be referred to as "gapped" bins.

Where the shielding is provided by 360° bins, the tops and bottoms of the bins are closed or effectively closed in some embodiments of the invention to prevent premature escape of the droplets and droplet mists from the bin.

Where the shielding means is provided by 360° bins or gapped bins as above defined, then the bins may be: (i) open-topped "single-piece" bins into which the birds are lowered; or the bins may take the form of (ii) "hinged bins" which can open or close about a carcass; or the bins may take the form of (iii) a (two-part) "split bin" where the two halves of the bin have no direct permanent connection between them and only come together to enclose the carcasses for plucking.

It may be convenient, where gapped bins are being used, to arrange for the bins to follow one another sufficiently closely for the gap in any one bin to be at least to some extent closed by a neighbouring bin.

In those embodiments where the plucking units and the carcasses move through the processing equipment during plucking, the overall path of the shielding means through the equipment either coincides with the path of the plucking units through the equipment or with the path of the shackle line, through the equipment.

Conveniently, when baffles are used to discourage carcass-to-carcass contamination, the poultry processing equipment includes means for continuously collecting and removing droplets from the system. Alternatively, the carcasses may be wholly enclosed or effectively wholly enclosed to prevent droplets escaping and the poultry processing equipment may then include means for extracting the droplets before the carcasses are released from their enclosures.

It is envisaged that when the plucking units include 360° single-piece bins, the carcasses can be scalded and plucked simultaneously using a combined scalder/plucker arrangement. Not only should this facilitate operational efficiency, but it should also restrict droplet mist formation and subsequent cross-contamination.

In one embodiment of the invention, the plucking heads are supported on a series of bins which move through the apparatus in a circular or other closed-loop path. For ease of description only, an apparatus having the above characteristics will hereinafter be referred to as a "carousel" system.

Conveniently, in such cases, the bins are hinged bins and the shackle line approaches the closed-loop path (e.g.

tangentially), moves along an intermediate section of said path, and then leaves said path (e.g. tangentially), control means being provided firstly to ensure that the bins are open at entry and exit end regions of said intermediate section to allow passage of the carcasses into and out of the bins and secondly to ensure that the bins are maintained closed during their passage between said end regions during which time the carcasses are plucked by the plucking heads.

In an alternative design of carousel system, the bins are open-topped single-piece bins and the shackle line operates to lower the carcasses into said bins for plucking and to raise them from the bins on completion of plucking.

In another embodiment, the plucking heads are supported on the two halves of a series of split bins with the first and second halves of each bin moving along respective closed paths which flank opposite sides of the shackle line over an operative section of their journey in which plucking is to take place, the separation of the two paths at said operative section and the spacing apart of successive bin halves in each of the respective closed paths being so arranged that opposite halves of each of the different bins come together over said operative section to embrace carcasses suspended there from the moving shackle line. For ease of description only, an apparatus having these characteristics will be referred to as a "twin track" system.

In both the carousel and, more particularly, the twin track systems described above, the bins may conveniently be 360° bins. Alternatively, however, they may equally well be gapped bins, preferably with each bin arranged so as at least in part to close up the gap in one of the neighbouring bins.

When, in the various embodiments of the apparatus according to the present invention, split bins or hinged bins are used, then each half of each bin when viewed in plan may be of generally U, J or L-configuration.

In construction, the bins may be made of relatively thin sheets (e.g. of stainless steel or polythene or other plastics material etc.) clamped on to a lightweight (e.g. stainless steel) space frame. Alternatively, the bin may be made of thicker self-supporting sheet (e.g. of stainless steel, polythene or other plastics material etc.). In each case, the sheet material may, for example, be flat, convex or moulded, as required.

In further embodiments of the invention where the shielding means is provided by baffles, the plucking units may be displaced to move the plucking heads between (i) inter-shield operational plucking locations in which the plucking heads move with the carcasses and the baffles, and (ii) withdrawal locations in which the individual plucking heads can be cleaned before their next plucking operation.

Where the shackle line moves continuously during plucking, the plucking heads can be supported on an indexed revolving or closed-loop reciprocating support structure which moves them between operational and withdrawal locations as required.

To facilitate the treatment of varying sizes of birds, the plucking heads may be mounted on their supports in "passive" or "active" fashion. Thus, in preferred embodiments, not only could torque be measured and the width of the plucking space changed, but a real time carcass damage sensing system (e.g. x-ray based image analysis to detect for bone breakage) could provide feed-back to control the width of the plucking space (i.e. an actively adjusted system). The sensing system would need to compare carcass damage at the start and end of the plucking machines to determine the level of damage caused by the pluckers and ignore that done before reaching the pluckers. A further sensing system (e.g. image analysis using modified visible light) might be incorporated as well as (or instead of) the carcass damage sensors to ensure that defeathering was still satisfactory. The reason for this is that much of the carcass damage can occur during plucking and that damage that causes bone fragments in the meat is particularly unwanted.

One example of a passively mounted head (especially favoured in carousel arrangements) would be a spring-loaded head.

In examples of apparatus having actively mounted heads (especially favoured in twin track arrangements), positioning means may be included to position the heads in response to the measured torque or power of one, each or several of the heads until a pre-determined torque or power value is achieved. With a twin track arrangement, for example, the positioning means might operate by adjusting the spacing between the track sections flanking the shackle line.

According to one optional feature of the invention, a fixed pipeline (e.g. dribble bar) with drilled or like-resulting holes (rather than high pressure nozzles) may be provided in the equipment in order to allow clean water to trickle onto the carcasses during the plucking operation. This keeps the contact between the carcasses and the plucking heads lubricated and carries the feathers away.

When single-piece bins are being used in the plucking units, e.g. in a carousel arrangement, then post-plucking cleaning of the units may, for example, be carried out using a (for example, conventional) post-evisceration carcass-cleaning design of lance which can be lowered (or raised) into each bin once the carcass has been removed. One such lance, for example, is the Automatic Inside/Outside Bird Washer supplied by Lindholst & Co. and other major processing equipment manufacturers.

When hinged or split bins are being used, then post-plucking cleaning of the units is preferably effected when the bins have been opened up (following removal of the carcass). Once again, a conventional post-evisceration carcass-cleaning design of lance could be used, after suitable modification, such as extending the lance to avoid the plucking machinery, higher pressure (or finer nozzles) and repositioned nozzles to direct the water (water/biocide mix) to the parts of the plucking machinery most in need of frequent or thorough cleaning. As an alternative and probably more effective and economic system is to use fixed spray booms to provide a water sluice followed by a bacteriocidal spray followed by a further water wash to remove the bacteriocide.

Another alternative is to use ultra violet light in place of the biocide following a cleaning wash to remove feathers etc. Where a biocide is used, however, it is envisaged that the micro-organism build up may be less rapid than initially forecast so that instead of having to always apply the biocide between every bird, it may be sufficient to apply one after a predetermined number of minutes or birds.

Cleaning may include extraction of droplet and droplet mist before, during and/or after releasing the carcass e.g. by controlled air flow and/or water spray and with the plucking heads either stationary or rotating slowly (e.g. to avoid generation of more droplet mist).

Throughout this specification (including the accompanying claims), any reference to "cleaning" must be taken to include, if desired, the optional step of disinfection.

For reasons of economy, the water used in the dribble bar and/or cleaning systems could be filtered, pasteurised and recycled.

In a twin track arrangement where the shielding means is provided by the synchronised bin halves of a split bin arrangement, the relatively lengthy track employed for the bin halves allows time for both plucking the carcasses and cleaning the plucking heads on the return journey without any significant increase in floor area. This advantage can be enhanced by having the bin half tracks curved (rather than straight) over the plucking and cleaning sections of the tracks.

When carousel and twin track systems are being used, the plucking units employed can have the plucking heads mounted only on opposite sides of e.g. in front of and behind, the plucking space for the carcasses. This enables the plucking units to be kept relatively slim. Plucking of the remaining sides of the carcass, to get an overall treatment, is achieved in such cases by causing relative movement between the plucking heads and the carcasses. One way of doing this is, for example, is to arrange for pegs or like obstructions extending from the shackles in the moving shackle line to contact fixed rails or like stationary abutments which will cause the shackles (and the supported carcasses) to deflect and/or rotate and/or oscillate. To optimise this process, a swivel joint may advantageously be built into the shackle if there is not already sufficient motion allowed by the shackle trolley and the trolley-to-shackle clevis.

Conveniently, plucking apparatus in accordance with the present invention may include means effective to reverse the rotational sense of the plucker heads.

Conveniently, a second finishing machine according to the present invention may be used with the plucker head rotation in the opposite sense to that used in the first machine.

Conveniently, plucking apparatus according to the present invention may include means effective to impart a relative vertical motion between the carcass and plucker heads e.g. of a magnitude of at least the effective working radius covered by the plucker fingers.

Conveniently, in this last case, the relative vertical motion can be achieved by having the plucker heads oscillating about a pivot so that they "nod", or, where a carousel is used, the axis of the carousel can be inclined, or, where a twin-track arrangement is used, either the unit-carrying tracks can be inclined or the shackle line can be ramped up and down.

Conveniently, apparatus in accordance with the present invention may include means whereby the plucking units move laterally in and out a little during the plucking process.

Conveniently, the spacing between the plucking units may be varied during the plucking process.

Conveniently, in some embodiments of the invention, means for effecting a 360° rotation of the carcass are included together with only one set of plucking heads and an appropriately-shaped shield.

Conveniently, in this last case, full rotation is obtained using blocks on one side only to form a crude rack and pinion system and all the plucking heads are on one side only or staggered first on one side and then on the other.

Conveniently, where rigid shields are used, these are held at the top so that they can only move sideways in the direction of the shackle line while at the bottom they are rigidly cross-connected so as to stiffen them and keep their movement in the form of a parallelogram.

The plucker units and shields may conveniently be all separate so that when plucker head angles or heights are adjusted, gaps are opened between longitudinal shields (behind the plucker heads) and transverse shields or baffles.

Conveniently, heavy gauge polythene is fitted along the edge of the transverse shields so that gaps are kept substantially closed while allowing the plucker head positions to be adjusted.

Conveniently, the bottom plucker head may be omitted or may be set off-centre and/or at an angle.

Conveniently, shielding is taken over the top of the apparatus e.g. using heavy polythene to cover as far as possible the holes at the top of the apparatus whilst leaving enough gap for the shackles to enter and then to rotate and move around.

Conveniently, with apparatus according to the present invention, it may be sufficient to have shields moving with the carcasses and the plucker heads stationary.

Conveniently, in this last case, the shields pass between the plucker heads by having the plucker heads move out briefly and allow the carcass-shield mass to swing through to the next position e.g. using flexible, split, flap-shields permanently fixed between sets of plucker heads.

In a particular embodiment of the invention using the principle of moving shields in a fixed position plucker, a "Contramatic" lay-out is employed.

Conveniently, in this last case, the plucking fingers are arranged in a slight helix and the shields are able to work their way through the fingers, immediately behind the carcasses. In use, the Contramatic arrangement also produces droplets which primarily go across and straight up and down, rather than along the machine, thereby perhaps inherently reducing cross-contamination by the droplets.

Any design that has fixed plucking heads and travelling shields will not be able to have effectively closed shielding so in these arrangements the droplet mist control will be "simultaneous" (as hereinafter defined) and only either by water droplets or air flow or both.

According to another aspect of the present invention, there is provided plucking apparatus for plucking poultry carcasses on a shackle line including a plurality of individual plucking units, one for each of a number of carcasses to be plucked at any one time, and shielding means included in or provided additionally to said plucking units whereby the plucking heads of each said unit are shielded from the plucking heads of the neighbouring units during plucking.

According to a further aspect of the invention, there is provided plucking units for use in the apparatus or equipment of the invention.

Embodiments of the invention will now be described, by way of example only, with reference to the illustrative and somewhat diagrammatic accompanying drawings in which:

FIGS. 7 and 7a show two further designs of plucking unit;

Figure 11:
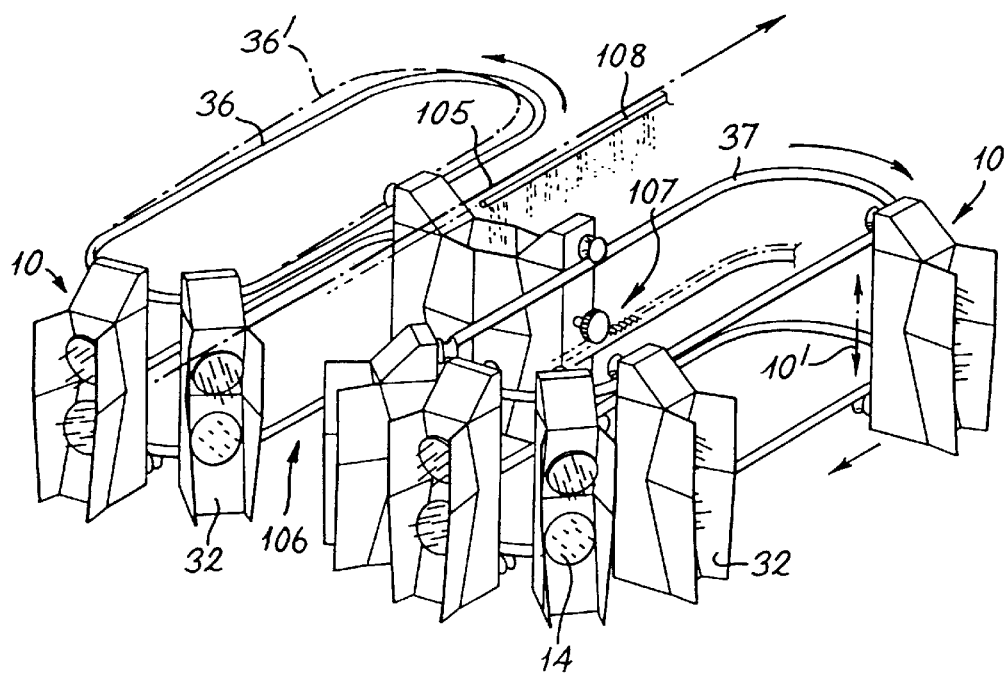
Figure 9:
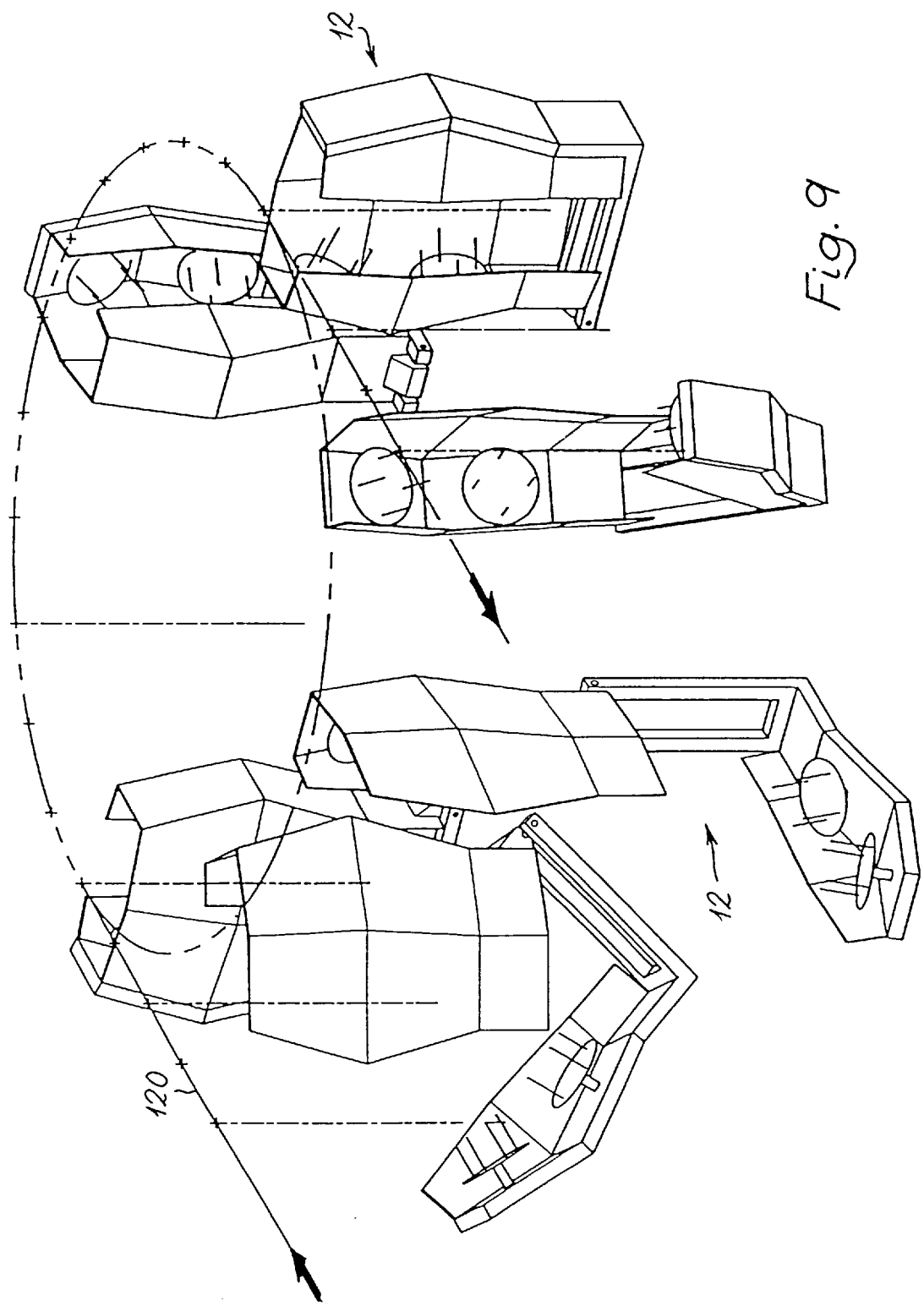
Figure 10:
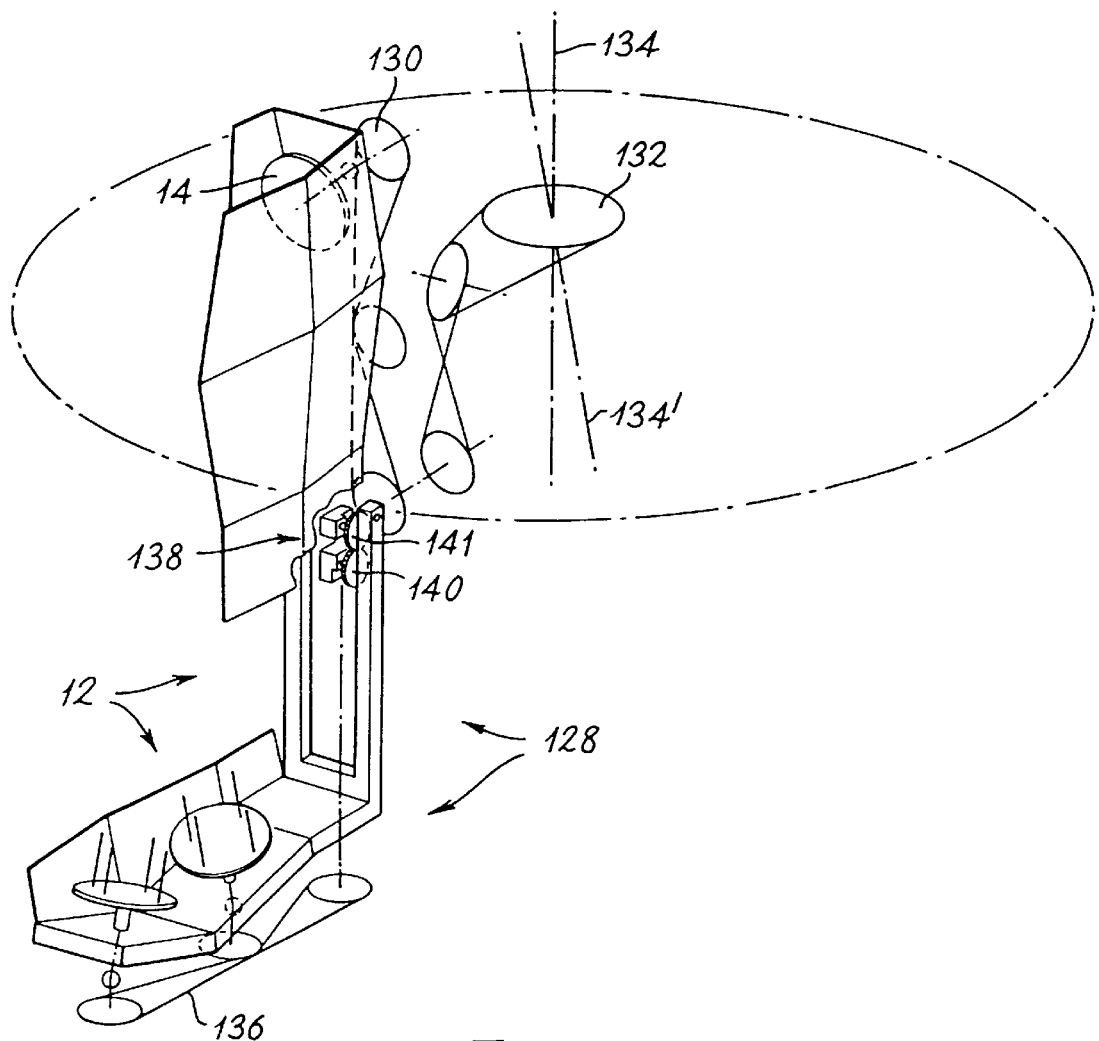
Figure 16:
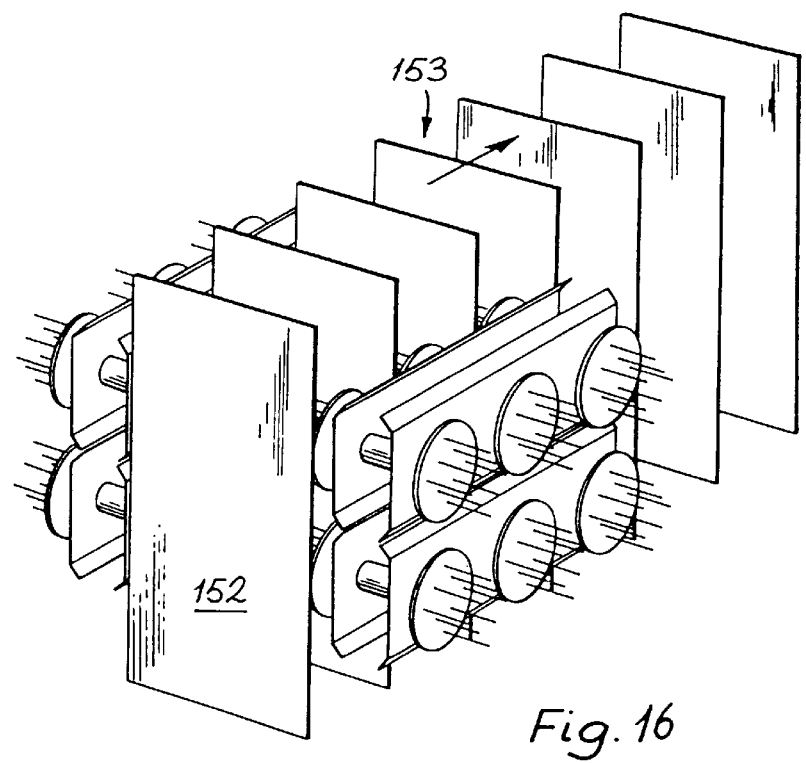
Figure 17:
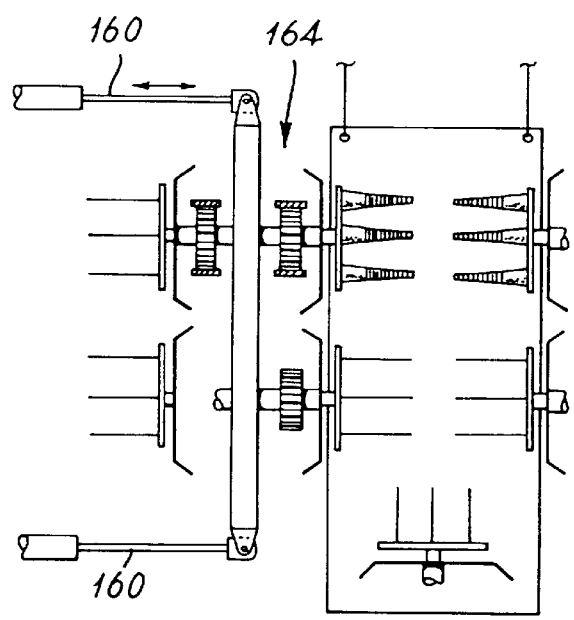
Figure 18:
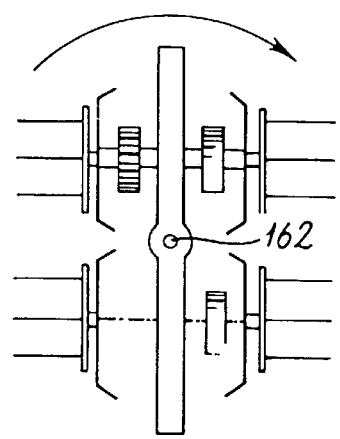
Figure 19:
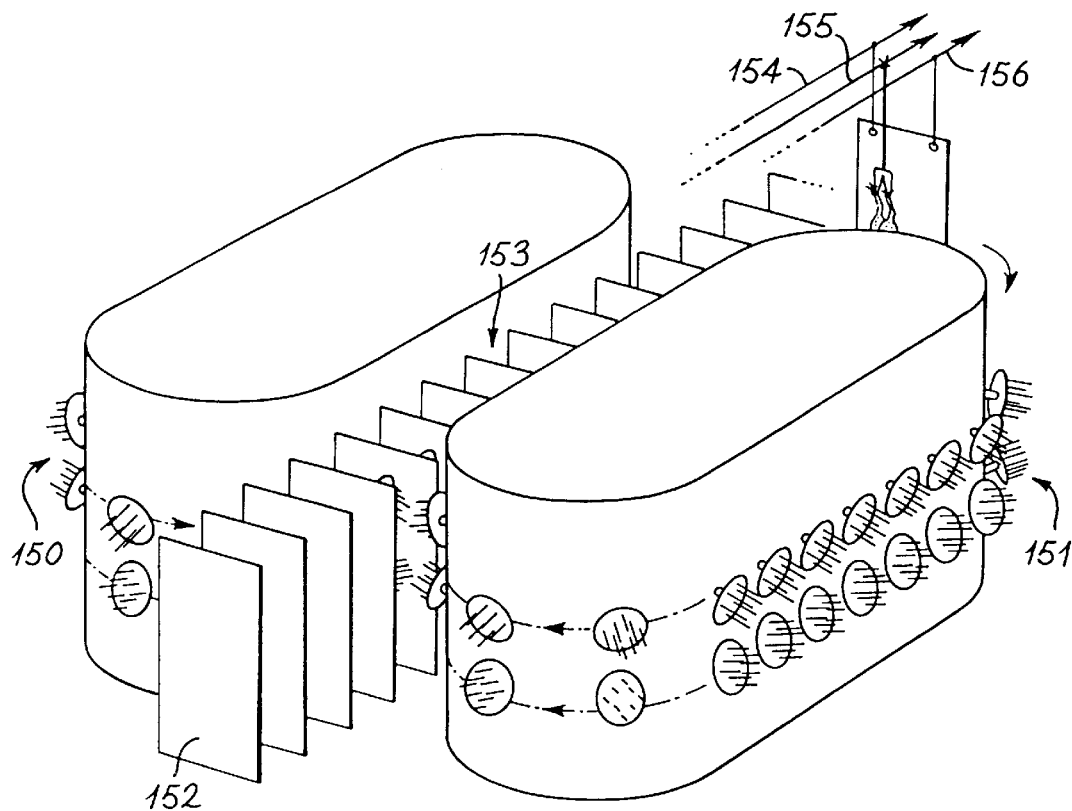
Figure 20:
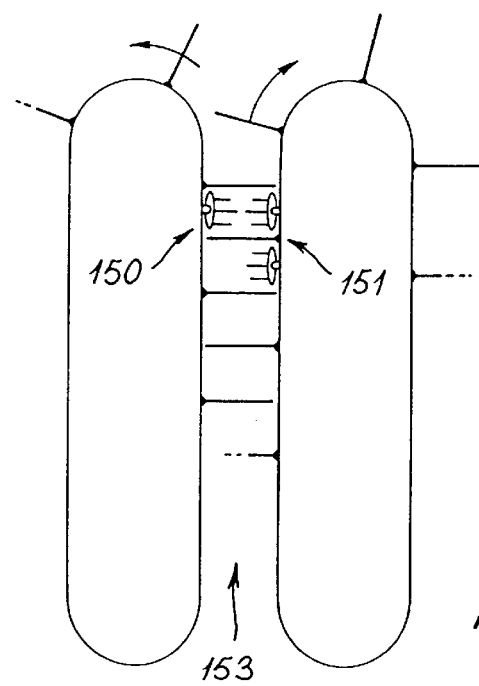
Figure 21:
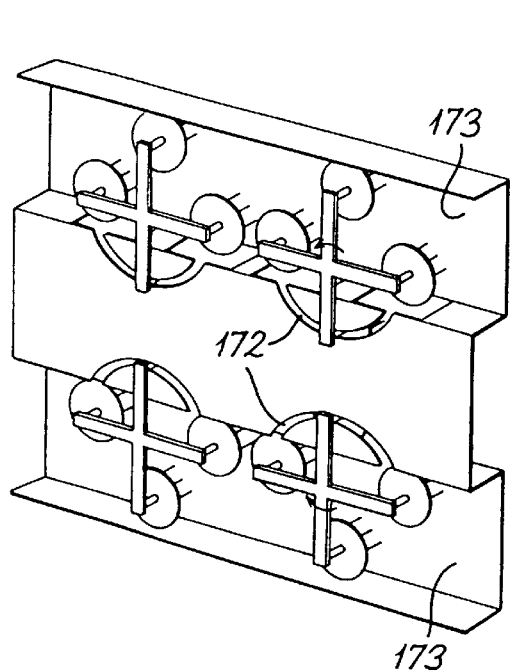
Figure 22:
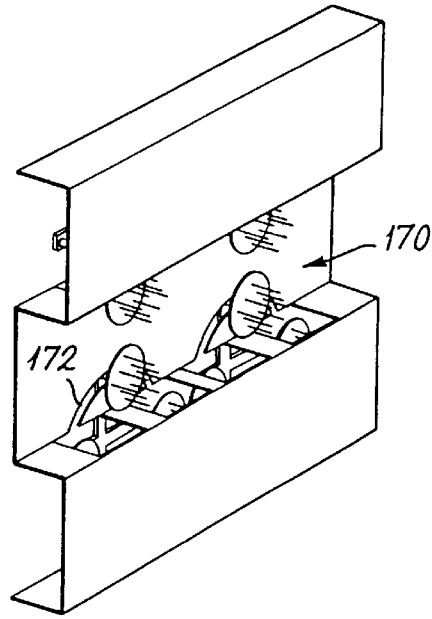
Figure 23:
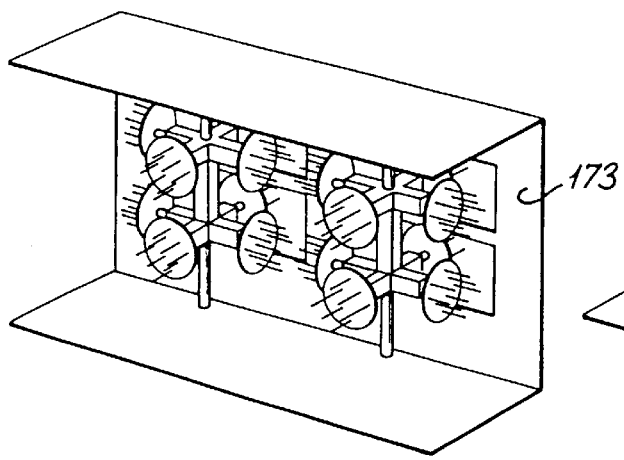
Figure 24:
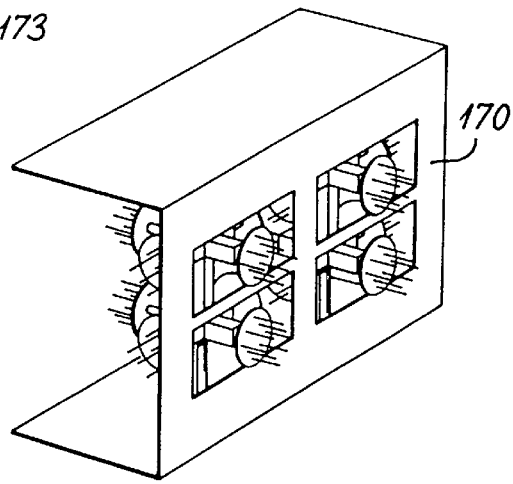
Figure 25:
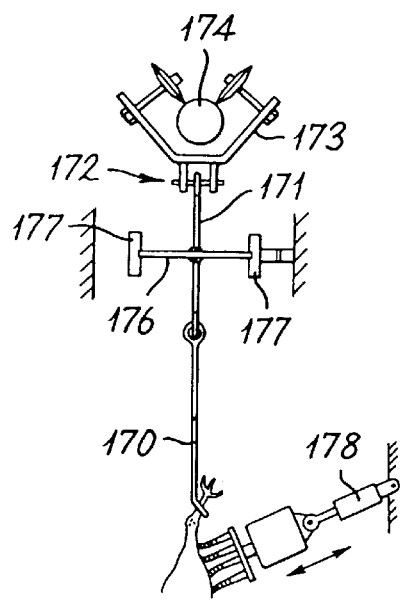
Figure 26:
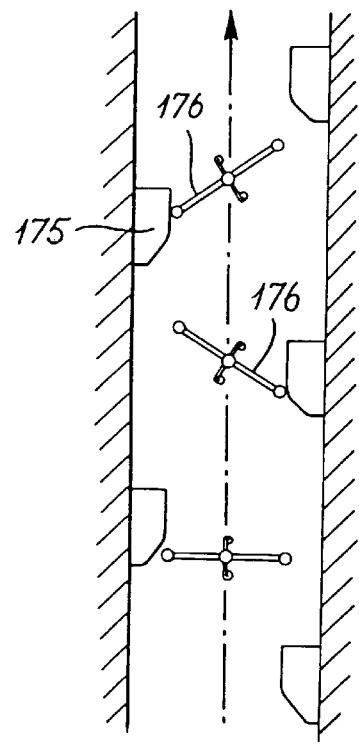
Figure 27:
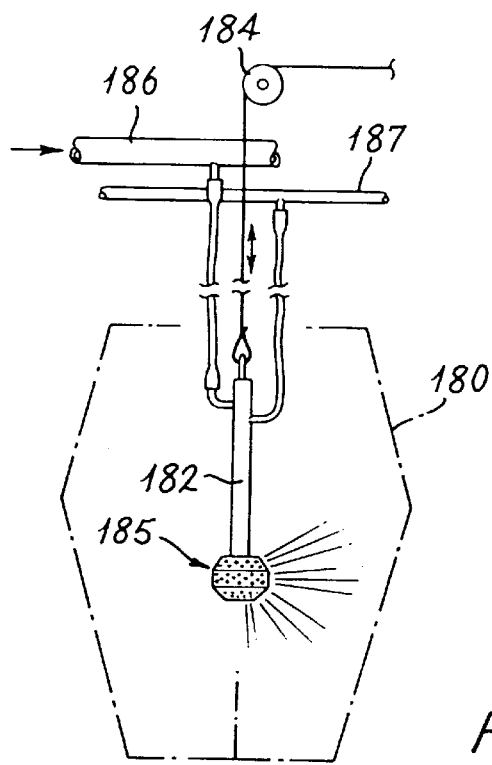
Figure 29A:
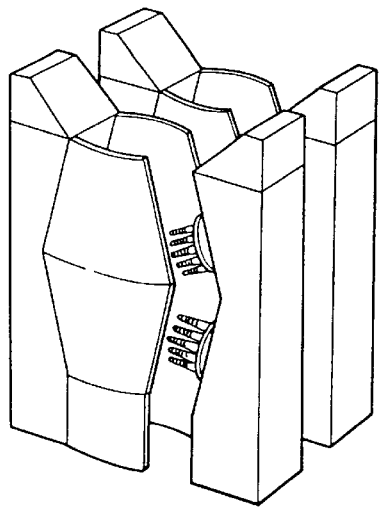
Figure 29B:
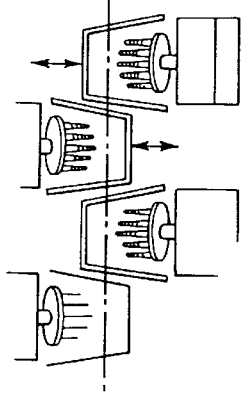
Figure 30:
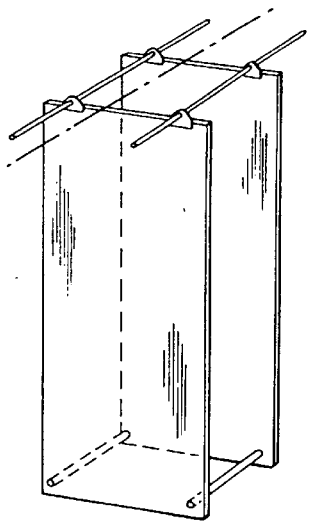
Figure 31:
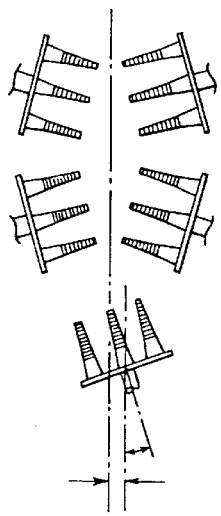
Figure 32:
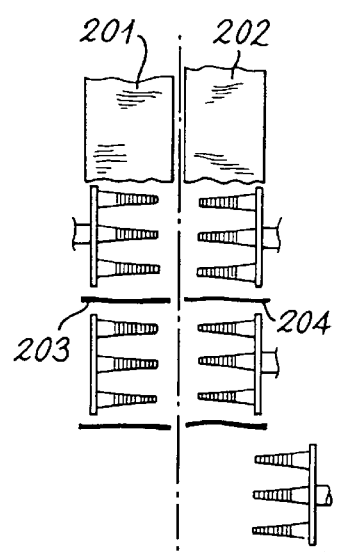

FIGS. 8, 8a and 8b respectively show a further design of plucking unit and two types of plucking head for use therein;

FIGS. 9 and 10 respectively show another design of carousel arrangement and a drive mechanism therefore;

FIG. 11 shows a split bin two-track arrangement;

FIGS. 12 to 15 show alternative designs of split bin for use in the arrangement of FIG. 11;

FIGS. 16, 17, 18 show a baffle-based arrangement;

FIGS. 19 and 20 show two alternative designs of baffle-based arrangement to that shown in FIGS. 16 to 18;

FIGS. 21 and 22 show a plucking assembly using a horizontal axis rotating arm system for supporting the plucking heads;

FIGS. 23 and 24 show another plucking assembly using a rotating arm system for supporting the plucking heads, this time with vertical rotation axes for the arms;

FIGS. 25 and 26 show different views of a shackle-agitating device for use with plucking units in which the plucking heads are confined to opposite sides of the units;

FIG. 27 shows one form of cleaning system for use with the plucking units of the earlier Figures and their modifications; and FIG. 28 shows a plucking assembly for working on a batch of birds while the line runs continuously;

FIGS. 29a, 29b, 29, collectively referred to as FIG. 29, show alternative designs of split-bin and staggered head arrangements;

FIG. 30 shows a shield arrangement for use in the embodiments of FIGS. 16 and 19, say;

FIG. 31 shows an alternative plucker head arrangement;

FIG. 32 shows the use of shielding over the top of an apparatus according to the present invention; and FIGS. 33a, 33b, 33c and 33d, collectively referred to as FIG. 33, illustrate various configurations for controlling and/or extracting droplets and droplet mist from the container for the carcasses.

Figure 1:
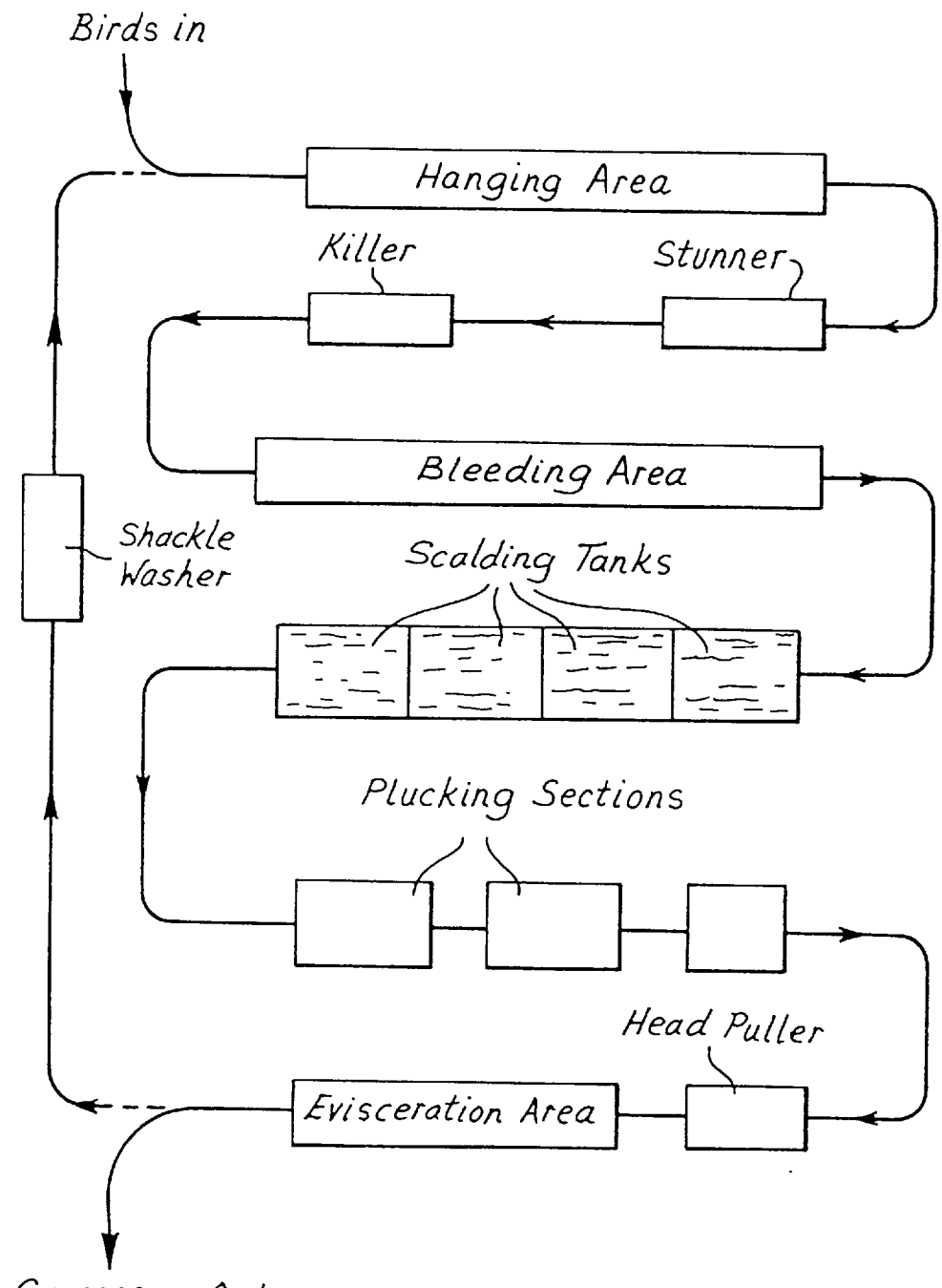
FIG. 1 illustrates poultry processing equipment according to the present invention.

Thus referring first to FIG. 1 of the drawings, this shows the more important stages of one embodiment of poultry processing equipment according to the present invention in which live birds are first transported in crates to a hanging area where they are removed from their crates and suspended upside down from a shackle line.

Thereafter, the shackle line carries the birds to (i) a stunner where an electric shock is applied to render the birds unconscious and insensible to pain; (ii) to a killer, where the necks of the birds are slashed; (iii) to a bleeding area where the carcasses are bled to the required degree; (iv) to a series of scalding tanks where the effect of the hot water in the tanks is to loosen the feathers and facilitate their subsequent removal from the carcasses; and (v) to one or more plucking sections where the feathers are removed from the carcasses by one or more plucking units constructed in accordance with the present invention.

The shackle line next transports the de-feathered carcasses to a head puller for decapitation and then to an evisceration area for removal of the birds' internal organs and cleaning of the eviscerated carcasses. After this, the carcasses are removed from the shackle line as indicated e.g. for packing and storage purposes.

Different numbers and types of plucking head are conventionally used to 'rough' pluck and 'finish' pluck the carcasses and this feature is maintained in the illustrated embodiment of the present invention where the first two plucking sections are intended for rough plucking, for example, while the third section is intended to finish pluck.

The plucking units 10 and the associated shielding means used in these sections may take several different forms in accordance with the present invention, although in all cases there will be no relevant movement between the units and their shielding during plucking.

Unless indicated to the contrary, each plucking head is arranged to rotate in the opposite rotational sense to its nearest neighbour(s) in the same plucking unit.

Figure 2:
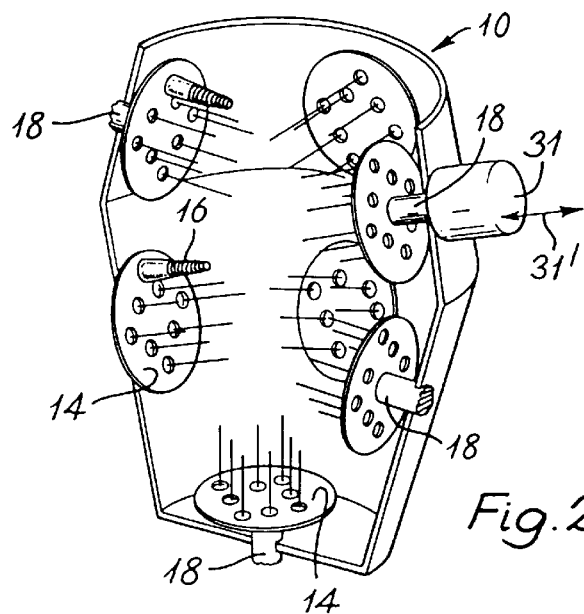
FIGS. 2 and 2a show a first design of plucking unit for use in the equipment of FIG. 1.

FIG. 2 shows a half section of one design of plucking unit 10 in accordance with the present invention where a single-piece bin 12 supports a plurality of plucking heads 14, each of which carries an array of conventional plucking fingers 16 arranged to extend parallel or at a slight angle to the associated drive axle 18 for the head. Each such axle is externally driven from a respective electric, pneumatic or hydraulic motor although, for simplicity, only one such motor has been shown in the drawing where it is identified by reference numeral 31. Both water and oil-based hydraulic/hydrostatic drives can be used, if desired, and the term "hydraulic motor" should be interpreted as embracing both such drives within its meaning.

It is to be noted that the plucking head 14 mounted in the base of unit 10 is used for plucking the feathers from the bird's neck. Accordingly, in a multi-stage plucking arrangement, this particular plucking head is likely to be omitted from the first stage or stages.

Figure 2A:
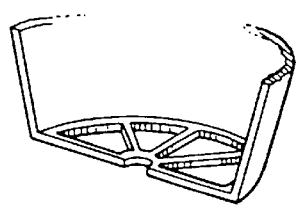

If desired, the base of bin 10 may be of a spider construction as shown in FIG. 2a so as to facilitate the egress of water and feathers from the bin.

In a variation of the FIG. 2 embodiment, the bin 12 is split about pivots across its base and in elevation it then resembles the view shown in FIG. 7 for a later embodiment.

Because the carcass is completely enclosed by the 360° one-piece bin unit of FIG. 2 during plucking, cleaning of the unit may be done away from the plucking site without any substantial risk of cross-contamination resulting. This should save space and/or time.

A further advantage of the complete encirclement afforded by a 360° bin, is that scalding can be carried out on the binned carcasses before the plucking operation is commenced. This enables the dedicated scalding tanks to be omitted from the plant of FIG. 2 which should help to reduce cross-contamination between individual birds by limiting droplet mist formation by ensuring that any droplet mix is contained until the mist is removed by water droplets or a controlled air flow.

Figure 3:
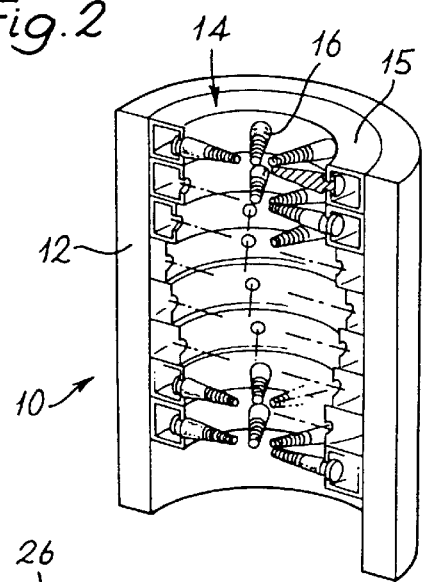
FIG. 3 shows a second design of plucking unit.

Referring next to FIG. 3, this shows a plucking unit 10 in accordance with the present invention where the plucking heads 14 are provided by a series of finger-bearing collars 15 stacked within the top-loading bin 12, typically with four or five plucking fingers 16 per collar, as shown.

In a first version of this embodiment, the collars 15 are keyed to a 360° bin 12, and co-rotate with the bin when this latter is rotated about its longitudinal axis by an appropriate drive (not shown). Typically for example, the bin could carry external gearing which engages with a stationary tooth rack so as to rotate the bin as it travels along the operational part of its traverse.

In a second version, the bin 12 is gapped to allow alternate collars to be counter-rotated relative to the intervening (also alternate) collars. This could be done via pulleys or by respective electric or hydraulic motors, e.g. from two contra-rotating vertical shafts geared to opposite ones of the two sets of alternate collars 15.

As illustrated, the collars 15 are of varying radial thickness so that the tips of the plucking fingers 16 (all of identical length), are disposed in desired fashion to present a predetermined plucking profile suited to the carcasses under treatment. In an alternative embodiment (not shown), however, this same profile could also be achieved by using fingers of different lengths mounted on a series of identical collars within the bin 12.

Figure 4:
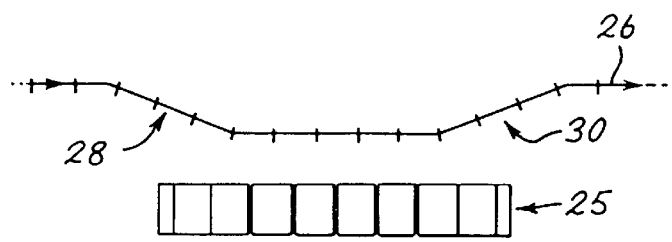
FIGS. 4 and 5 show a carousel arrangement for circulating plucking units according to the present invention through the processing equipment.
Figure 5:
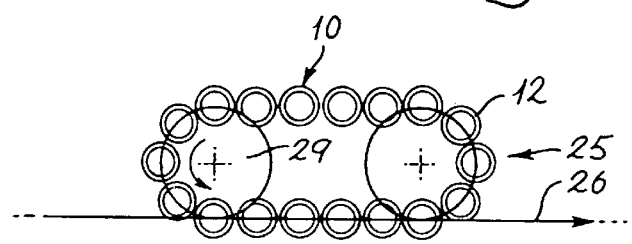

A typical carousel-type plucking assembly including some dozen or so of the single-piece bin units already described is diagrammatically shown in FIGS. 4 and 5.

In this assembly, the scalded carcasses are suspended from an overhead shackle line 26 which, as it travels down an appropriate ramp 28, lowers the carcasses into the open-top plucking units 10. These latter are moved along at the same speed as the shackle line by a driven drum 29 so that there is no relative motion between the shackles and the plucking units during carcass transfer or plucking.

Once the plucking operation has been completed, the shackle line travels up a ramp 30 to lift the carcasses clear of the bins 12 and on to the next stage of the processing plant where they are automatically cleaned etc. as earlier described.

Figure 6:
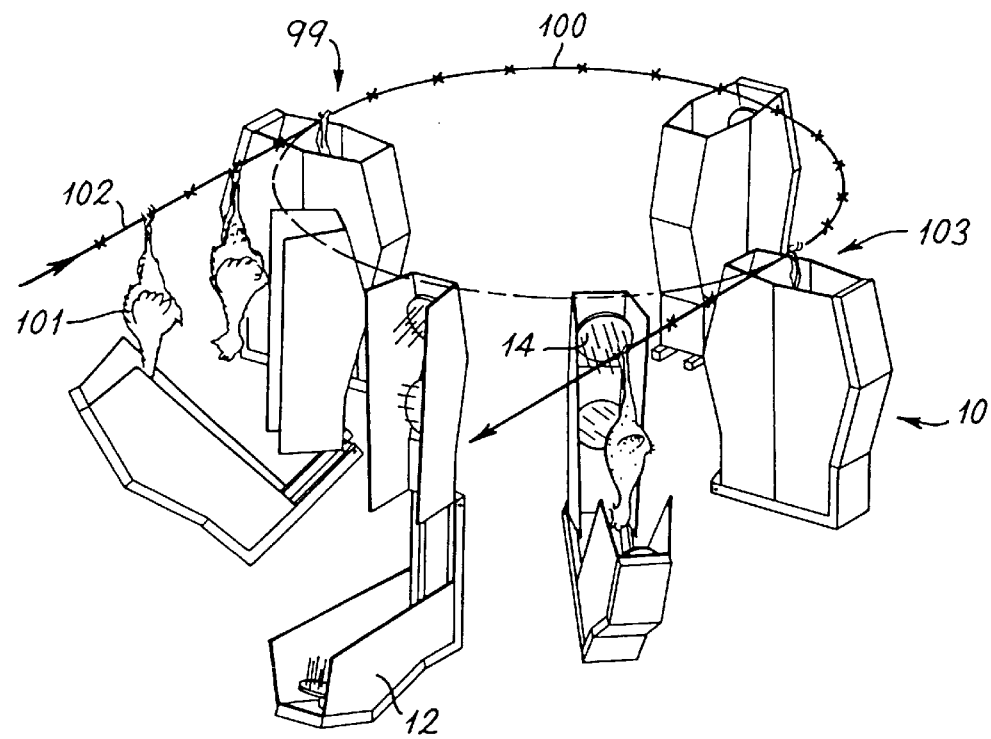
FIG. 6 shows another design of carousel arrangement.

FIG. 6 shows a different design of carousel arrangement 100 in which the bins 12 are hinged and the carcasses 101 are fed tangentially from the shackle line indicated diagrammatically at 102.

An appropriate cam control (not shown) is effective to open and close the bins at different points in their path as illustrated in the drawing.

Thus as the carcasses arrive at the entry point (99) for the carousel 100, the cam control operates to close the open bins 12 (with their plucking heads 14) around each carcass, and bin and carcass then travel round together while plucking is taking place. Once arrived at the exit point 103 at which the shackle line 102 leaves the carousel, the bins 12 and their plucking heads are opened by the cam control to allow removal of the plucked carcasses. Each of the open bins then continues on its return journey round the carousel where it is cleaned as already described before arriving back at the entry point 99 to receive the next carcass to be plucked in it.

Advantages associated with a carousel system in accordance with the present invention are first that they rely on a mainly circular motion which allows services to be available from central axle of the system, secondly that the system is fully enclosed, thirdly that the plucking/cleaning time ratio can be readily determined, for a given carousel diameter, by fixing the wrap angle of the shackle line about the carousel, and fourthly that the head cleaning operation can be carried out at a location well separated from the plucking area.

Variants of the FIG. 6 plucking units include the embodiments of FIGS. 7 and 8 which are of a different geometry to the earlier embodiment though functionally very similar. It should be noted, however, that whereas the FIG. 7 embodiment has disc type heads of the same type as in the FIG. 2 embodiment, the FIG. 8 embodiment uses drum type heads mounted on horizontal axes for plucking the sides of the carcass and a vertical-axis disc head in the base of the bin to pluck feathers from the neck of the carcass.

The full and broken lines in FIG. 7, respectively illustrate the plucking unit 10 with the bin 12 in its closed and open positions while the details of FIGS. 8a and 8b show examples of alternative plucking profiles for the drum-mounted fingers in the FIG. 8 embodiment.

An alternative design of bin unit (not shown) utilises the casing 12 of the FIG. 7 embodiment with its hexagonal or substantially hexagonal cross-section, but differs from this embodiment in having two plucking heads 14 for each two-part side and none in the floor section i.e. twelve plucking heads in all. The bin halves are connected with the remainder of the unit by a suitable pivot. In a variation of this alternative design, the twelve plucking heads comprise drum type heads mounted on horizontal axles in the manner shown for the drum heads in the FIG. 8 embodiment. An additional floor-mounted plucking head may also be included in the manner of the FIG. 2 embodiment.

Turning now to FIG. 9, this varies from the FIG. 6 embodiment in showing a carousel arrangement using gapped hinged bins 12 of either J-profile or mixed J- and L-profile type in place of the 360° hinged U-profile bins of the FIG. 6 arrangement. In practice, only one of the two bin types illustrated could be used in the one apparatus.

As with FIG. 6, however, only some of the bins have been shown in FIG. 9 and, as before, the positions of the remaining bins are spaced to coincide with the positions of the carcasses (indicated by crosses) on the shackle line 120. This enables the gap in each bin to be to a large extent closed off by the uninterrupted wall of the succeeding bin.

FIG. 10 diagrammatically illustrates a belt and pulley arrangement 128 for driving the plucking heads in the carousel using a pulley system in which each plucking head 14 is associated with a respective pulley, such as pulley 130, driven, ultimately, from a master pulley 132 on a centrally-located drive shaft 134.

It will be observed that the head pulleys 130 for each half of the bin 12 are interconnected by a belt 136 so arranged around the pulleys as to cause adjacent pulleys to rotate in opposite rotational senses.

A gearing unit is also included at 138 so that pivotal motion of one half of the bin can occur relative to the other half. This motion is allowed by the orbital displacement of 141 associated with its other half.

As an alternative to the carousel-based systems, FIG. 11 shows a twin-track arrangement in which the bins 12 are split bins with the plucking heads 14 mounted some on one and some on the other of the two bin halves.

As will be clear from the Figure, each bin half travels around the associated one of the two tracks 36,37 and both these tracks which have adjacent straight portions flanking a section 105 of the shackle line path.

At the entry point 106 to section 105, the two bin halves meet to enclose the feathered carcasses and plucking occurs as the units 10 move along this section, the plucking heads being driven by a toothed rack and pinion arrangement as indicated diagrammatically at 107. During plucking, a degree of bin rinsing is effected by an overhead dribble bar 108.

At the end of section 105, the bin halves separate again to release the plucked carcasses which continue on their way as indicated.

As with the previous embodiment, the units 10 are cleaned while they are on their return path to their start positions at entry point 106.

Advantages of twin track systems in accordance with the present invention include the simple drive arrangement they allow and the ease of cleaning and finger changing thanks to the bin being fully open during its return travel.

It will be noted that the embodiment of FIG. 11 uses shields 32 which are 'U' shaped when viewed in plan so as to meet along the centre line of the assembly beneath the shackle line. These shields are preferably designed to be of a flexible nature so as to minimise any risk of their trapping and damaging the wings of the carcasses.

Alternative types of split bin for use in the embodiments of the present invention are shown in FIGS. 12 to 15 of the drawings.

Figure 12:
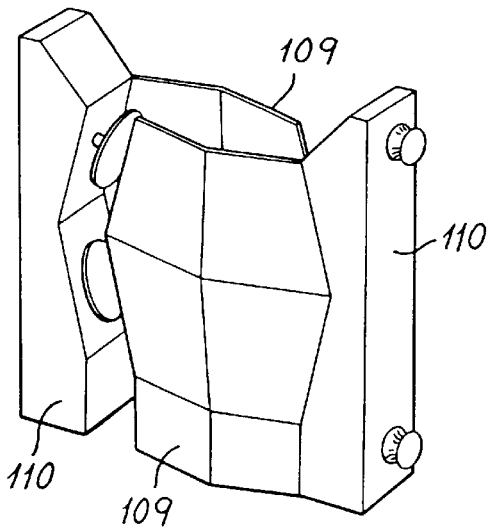

Thus FIG. 12 shows a 360° split bin with what has been termed L-profiled bin halves with the long arm of the L-shape provided by the shielding 109 and the short arm provided by the head support structure 110.

Having bin-halves of 'L' shaped profile which meet on the diagonal, substantially avoids any likelihood of the wings becoming trapped between the bin halves so that a more rigid construction may be used.

A further advantage of L-shaped shields is that they cause the plucking heads 14 to push the carcass away from the closing point between the bin halves and this further reduces the likelihood of their causing damage to the carcass.

Figure 13:
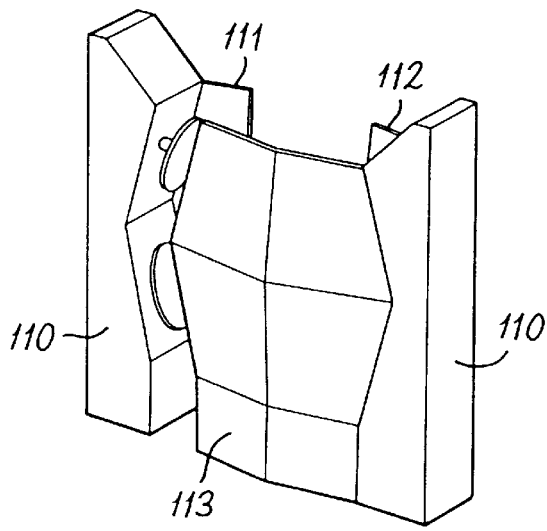

In the gapped split bin of FIG. 13, the support structures 110 carry two short gap-defining shields 111,112 backed by a single long shield 113. Thus using the terminology of the present specification, the single shield bin half would be referred to as L-profiled while the double shield bin half would be referred to as J-profiled.

Figure 14:
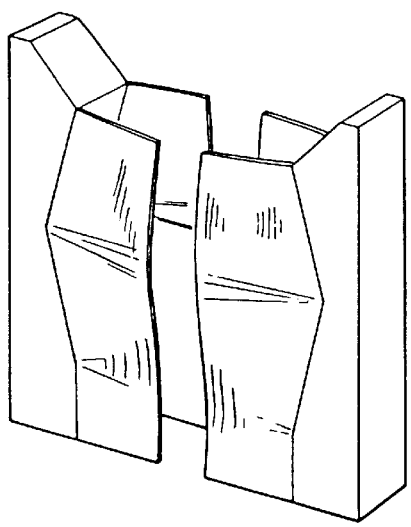
Figure 15:
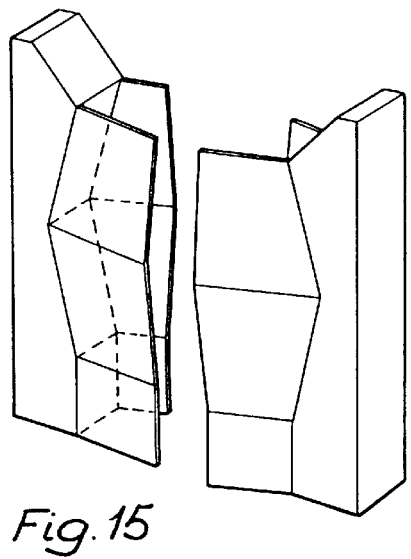

FIG. 14 shows a 360° split bin using two U-profiled structures of self-supporting flexible material e.g. rubberised plastics material. Alternatively, polythene or like lightweight cladding material on a stainless steel space frame could be used instead, if desired. FIG. 15 shows a gapped split bin using the pre-formed J-profiled structures.

It should be noted that the shielding in the embodiments of FIGS. 12,13 and 15 preferably comprises rigid, self-supporting structures, either of substantially rigid material (e.g. thick plastics material or stainless steel sheet), or of a lightweight cladding material (e.g. polythene) supported on a rigid space frame of stainless steel or the like.

In further embodiments, instead of having a complete set of bins with each bin surrounding an individual carcass, a single set of baffles may be provided as the shielding means with each baffle separating the adjacent carcasses during plucking and the plucking heads entering and leaving the inter-baffle spaces at the appropriate moment.

Conveniently, in this last case, the plucking heads are driven by individual electric or hydraulic motors or by a rack and pinion system as described with reference to the embodiment of FIG. 9 or by a pulley or pulley and geared system.

FIGS. 16 to 18 are different views of one such indexed baffle-based system with the plucking units being moved into and out of their operative positions perpendicularly to the shackle line path by rams 160 at the ends of their parallel traverse over the plucking section 153.

As will be clear, the plucking units shown in FIGS. 16 to 18 are double faced so that when the inner plucking heads are operative, the outer ones are being cleaned and are ready for the next plucking operation when the units are pivoted 180° about their vertical axes 162 prior to their re-introduction between the baffles 152.

FIG. 17 also illustrates a rack and pinion drive system 164 by which the plucking heads can be rotated during their traverse along section 153 and the return path. In modifications, not shown, the rack and pinion system is omitted and the plucking heads are rotated by individual electric, pneumatic or hydraulic motors or from one motor through a pulley system.

FIGS. 19 and 20 illustrate two further baffle-based systems in which the disc heads are tracked and move with the shackle line. In essence, therefore, this design is in some senses a combination between the fully enclosed twin track units and the revolving arm type already described. The disc heads move with the birds and are cleaned while returning to the start of their motion.

Thus, FIG. 19 shows a tracked arrangement in which the orbiting plucking heads of two separate head systems 150, 151 line up with one another on opposite sides of the shackle line path section 153 where plucking is to occur.

During their motion along this section, successive groups of plucking heads from the two systems are separated from one another by a series of baffles 152 suspended with the carcasses from overhead lines 154,155,156.

FIG. 20 illustrates an alternative baffle-dependent system in which the motion of the baffles is linked with that of the plucking heads by having common supports for both items, alternate baffles being linked with head system 150 in this way and the intervening baffles being linked instead with the head system 151.

In the embodiments of FIGS. 19 and 20, it is to be understood that cleaning of the plucking heads will take place during their return motion after plucking while that of the baffles 152 etc. will also occur after removal of the carcasses and before the baffles return to the plucking section 153.

FIGS. 21 and 22 and FIGS. 23 and 24 illustrate alternative designs of baffle-based embodiments in which the shackle line carries the carcasses along channels 170 flanked by opposed groups of plucking heads which extend into these channels through arcuate slots 172.

Each plucking head is one of a group of four such heads mounted on a pivotal support so that when one head of each group is operational, the others are remote from the carcasses e.g. as shown at 173 and can be cleaned prior to being called into operation again.

The two designs of FIGS. 21 to 24 allow a fairly simple all-belt single plane drive to the plucking heads and timing belt/chain synchronised drive to the revolving arms supporting these heads. Other advantages reside in a piece of apparatus which is likely to be narrow, and the easy removal of feathers from the unit during and following plucking.

The only important difference between the two embodiments is that in the embodiment of FIGS. 21 and 22, the head-supporting structures rotate about horizontal axes while in the embodiment of FIGS. 23 and 24, they rotate about vertical axes. This last version has the advantage that this encourages better separation between adjacent dirty and clean heads.

In yet another design, shown in FIG. 28, indexed units such as unit 189 are provided so as to provide a hybrid between the fully enclosed type and the revolving arm type which effectively would work on a batch of birds while the line runs continuously. Using a revolving arrangement 192, 193, the working head would stay in position and the complete assembly 189 would travel in direction A from position 190 with the shackle line 194. At the end, when the assembly had reached new position 191, the working head would move clear, the whole assembly return rapidly to the start (in direction B), and a cleaned head would be brought into work by rotation of items 192,193. The dirtied head would be cleaned while the assembly 189 travels with the line again in direction A. Regarding the dimensions of assembly 189, a commercial machine would be likely to be about 15 or 16 meters total plucking length (typically three machines of 5 meters each or two of 8 meters each). The exact length depends greatly upon the line speed and also on the end product (fresh/frozen/ portioned) and bird type (young broiler or old hen). The distance between positions 190 and 191 is typically about 10 meters for a 15 meter machine. Reference numerals 195 indicate the action of two of the rams/linear actuators (not shown) mounted to act on each cross-piece to swing the plucking units into and out of work while reference numeral 196 indicates the action of one of the rotary actuators (not shown) mounted at the ends of the assembly to oscillate each set of plucking heads.

The advantages of this last design is that it is simpler than the fully enclosed version, the drives are relatively easy as the heads and motor are all on the same assembly, and it allows relatively easy adjustment as heads and motor can all be on the same assembly.

In modifications of the above embodiments, fans are fitted to apply an airstream to control the movement of any aerosol and water droplets within the apparatus. Alternatively, or additionally, the shielding means provided by the bins or baffles, as the case may be, can be profiled or have guttering attached to ensure that dirty water is directed away from the carcasses and rotating machinery which might throw dirtied water onto other carcasses.

In all the various embodiments and modifications described above, where the plucking heads are confined to the opposite sides of the carcasses, it is usually advantageous to introduce an agitation means for providing increased relative movement between the carcasses and the plucking heads. This causes a chaotic motion of the carcass to result in a more complete plucking operation as different parts of the carcass are brought into the range of the plucking heads. Thus it is envisaged that in modifications of these embodiments, this result could be achieved by fitting stops to contact the shackles from which the carcasses are suspended so as to cause them to either displace or oscillate or, if the shackles are fitted with a turntable, to rotate.

One such arrangement is shown in FIGS. 25 and 26, for example, from where it will be seen that the lower shackle parts 170 are suspended from a peg-bearing upper shackle part which is in the form of a hook 171 which is suspended via a clevis 172 from a shackle trolley 173 running along support rail 174.

In accordance with the optional feature of the invention under discussion, fixed rails or other abutments 175 are secured on either side of the shackle line so as to be engaged at random by the opposite ends of the shackle pegs 176 which are fitted with end sliders 177 to ensure adequate contact with the abutments 175.

Engagement as above described displaces, rotates or oscillates the shackles concerned from their normal positions (in which the shackles lie in-line with the shackle line) to a variety of other positions in which other parts of the carcasses are brought into contact with the plucking heads for a more complete plucking operation.

Lastly, FIG. 27 shows a cleaning assembly for e.g. a single piece bin 180, comprising a conventional post-evisceration carcass-cleaning lance 182 which can be temporarily lowered into the bin using a pulley arrangement 184 as shown or some other suitable system e.g. a pneumatic ram or a cam arrangement (not shown).

The head 185 of the lance is fed by water and disinfectant from supply lines 186,187 respectively and operates to produce a symmetrical spray pattern (only half of which is shown in FIG. 27) about the axis of the lance.

In order that all areas of the birds are efficiently plucked, they should preferably experience a varied scrubbing direction by the fingers. With this in mind, the preferred embodiments of the plucking apparatus of the present invention may include means effective to reverse the rotational sense of the plucker heads e.g. in the embodiment of FIG. 2, the direction of motor 31 may be reversed by operation of a conventional switching arrangement (not shown). Alternatively, a second, finishing, machine according to the present invention may be used with the plucker head rotation in the opposite sense to that used in the first machine e.g. as with the successive plucking stations shown in the equipment of FIG. 1.

As another alternative, the apparatus of the present invention may include means effective to impart a relative vertical motion between the carcass and plucker heads of a magnitude of at least the effective working radius covered by the plucker fingers.

In this last case, the relative vertical motion can be achieved by having the plucker heads oscillating about a pivot so that they "nod" e.g. as indicated in chain-dot line in FIG. 7a. Alternatively, where a carousel is used, the axis of the carousel can be inclined e.g. as indicated at 134' in FIG. 10. Where a twin track arrangement is used, on the other hand, either the unit-carrying tracks can be inclined e.g. as indicated at 36' on the left-hand side of FIG. 11 (so that the plucking units rise and fall during operation), or the shackle line can be ramped up and down e.g. as indicated by the double-ended arrow 10' on the right-hand side of FIG. 11 (to raise and lower the carcasses during the plucking operation).

Conveniently, embodiments of the present invention may include means whereby the plucking units move laterally in and out a little during the plucking process e.g. as indicated by arrow 31 in FIG. 2. If, the shackle is oscillated and the carcass is not rotating, then it is probably preferable that the plucking heads be pulled apart slightly to give the carcass more space to rotate and be properly plucked. Similarly, it may be necessary to ensure that the spacing between the plucking units is varied slightly during the plucking process to cater for slight differences in bird size when an active or passive torque sensor is not included. One such optional arrangement is provided by ram 178 in the arrangement of FIG. 25.

Embodiments of the invention are also envisaged in which means for effecting a 360° rotation of the carcass are included so that birds can be satisfactorily plucked with only one set of plucking heads and a "V" shaped shield. Embodiments of this type based on the FIG. 14 system, are shown in FIG. 29 where full rotation is obtained using the system of FIGS. 25 and 26 but varied so that the blocks (175) are on one side only to form a crude rack and pinion system. This has the advantage of allowing closer spacing of carcasses either by having all the heads on one side only as in the arrangement of FIG. 29(a), or by staggering the heads first on one side and then on the other as in the arrangement of FIG. 29(b).

The FIG. 29(a) arrangement, which shows baffles with a slight "J" profile which meet to form the "V", is especially suited to the carousel and twin track arrangements whilst the FIG. 29(b) arrangement is best suited to batch type units e.g. the units of FIGS. 16–28, that shown in FIG. 20 being especially easy to modify in this way.

Figure 29C:
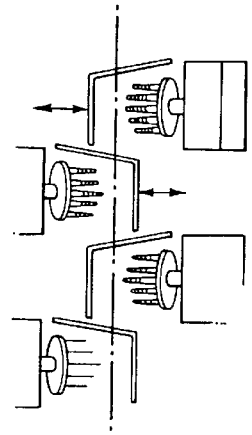

FIG. 29(c) shows an arrangement having "J" section gapped shields which meet to form a "V" similarly to the gapped shields in FIGS. 9 and 15.

In practice, the shielding 32, 109, 112,113 etc. needs to be quite rigid. Perspex about 3 mm thick or aluminium 1 mm thick are both acceptable although the aluminium shielding better reduces carcass movement from the plucking heads so as to give an improved pluck. If perspex is used for the baffles, then extra reinforcing should preferably be included at the stressed mounting points.

Conveniently, the arrangements of FIGS. 16 and 19, for example, can be modified as shown in FIG. 30 by having the rigid shields 152 held at the top so that they can only move sideways there (in the direction of the shackle line). At the bottom, they are either rigidly cross-connected so as to stiffen them and keep their movement in the form of a parallelogram or they are positively located there to prevent sideways movement.

The plucker units and shields may conveniently be all separate so that when plucker head angles or heights are adjusted, gaps are opened between the longitudinal shields (behind the plucker heads) and the transverse aluminium or perspex shields or baffles.

Conveniently, heavy gauge polythene is fitted along the edge of the transverse shields so that gaps are kept substantially closed while allowing the plucker head positions to be adjusted.

Conveniently, 20 cm centres are used for the shackles and, to keep the plucking fingers working within a 20 cm diameter, discs are used that are smaller (e.g. 13 cms diameter) than normal (e.g. 17 cms diameter) and therefore have to run faster than normal so that the desired tangential speed of the tips of the outer fingers is maintained at, say, around 14 meters per second (tip speed).

Conveniently, the bottom plucker head (as shown in FIGS. 2, 7a and 8) may be omitted. However, when a bottom plucker is used, it may be appropriate for the bottom plucker to be set off-centre and/or at an angle. One such arrangement is illustrated in FIG. 31.

Shielding should preferably be taken over the top of the apparatus as many droplets and some feathers appear there. FIG. 32 shows one such arrangement in which heavy polythene shielding 201, 202 (e.g. as used in an industrial curtain type door for cold-room entrances etc.) is attached to cover as far as possible the holes at the top of the apparatus whilst leaving enough gap for the shackles to enter and then to rotate and move around.

It is thought that with conventional plucking equipment, an important route of cross contamination is droplets and feathers which are spun off the plucker heads and land on birds in front and behind those currently being plucked. If this is the case, then the shields used in the apparatus of the present invention may well prove to be an important control measure in that apparatus and it may be sufficient to have shields moving with the carcasses (as in the arrangement of FIG. 19) and the plucker heads stationary, although controlled air flow and/or applying water droplets to remove the droplet mist may also be needed. Embodiments constructed in accordance with this latter teaching would require the shields to pass between the plucker heads. One way of achieving this could be to have the plucker heads move out briefly and allow the carcass-shield mass to swing through to the next position. This could be achieved using flexible, split, flap-shields 203,204 permanently fixed between sets of plucker heads as in the arrangement illustrated in FIG. 32. Similarly, in some designs, in accordance with the present invention, careful attention to the radius or shape of the plucking disc and finger tips may help produce larger droplets which could be caught by well placed short shields with the contaminated water channelled away from the carcass.

The easiest way to adopt the principle of moving shields in a fixed position plucker may be to use the teachings of a standard "Contramatic" machine; this machine uses the drums as in the arrangements of FIGS. 8a etc. By having the fingers in a slight helix, the shields should be able to work their way through the fingers, immediately behind the carcasses. In use, the Contramatic arrangement also produces droplets which primarily go across and straight up and down, rather than along the machine, thereby perhaps inherently reducing cross-contamination by the droplets.

Conveniently, the dispersion of the droplets is controlled throughout the plucking operation. In a first method of doing this, simple baffles are used to discourage carcass-to-carcass contamination e.g. as in the arrangements of FIGS. 16 and 19, say, and the droplets are continuously collected and removed. This is termed "simultaneous control". In an alternative system, using what may be termed "sequential control", the carcasses are located virtually wholly within closed or effectively closed containers to prevent the droplets escaping and droplets are then extracted at a later stage of the process. Suitable arrangements for use with the sequential control method are those of FIGS. 3, 6 to 9 and 11 to 15 etc. but modified, where necessary, so that both the tops and bottoms of each container are closed or effectively closed off. This modification requires either that the dribble bar (e.g. item 108 in FIG. 11) be omitted or that slots, say, be carefully positioned in the tops of the enclosures to allow sufficient water in from the dribble bar without too much escaping.

Sequential control systems as above described conveniently operate to provide a water spray around the bird. This washes out the droplets which then settle out and are drained away. The water spray may be generated by any convenient method of spraying including hydraulic nozzle and spinning disc.

Alternative designs of sequential control system use an air flow to control the path of the droplets and to vent them away to a safe area. This airflow can be generated by internally pressurising the carcass container or by applying a vacuum. If venting is impractical, it may be advantageous to deposit the droplets using normal filters, scrubbers or electrostatic depositors.

It is feasible that practical control methods will combine both approaches e.g. using a water spray during plucking followed by air flow venting before the carcass is fully released from the enclosing container.

Examples of control systems in a sequential plucking arrangement are shown in FIGS. 33. Batch plucking arrangements may be derived using the same control principles but in this last case, the number of droplet-controlling devices will have to be increased in order to service all the batch in one go.

Figure 33A:
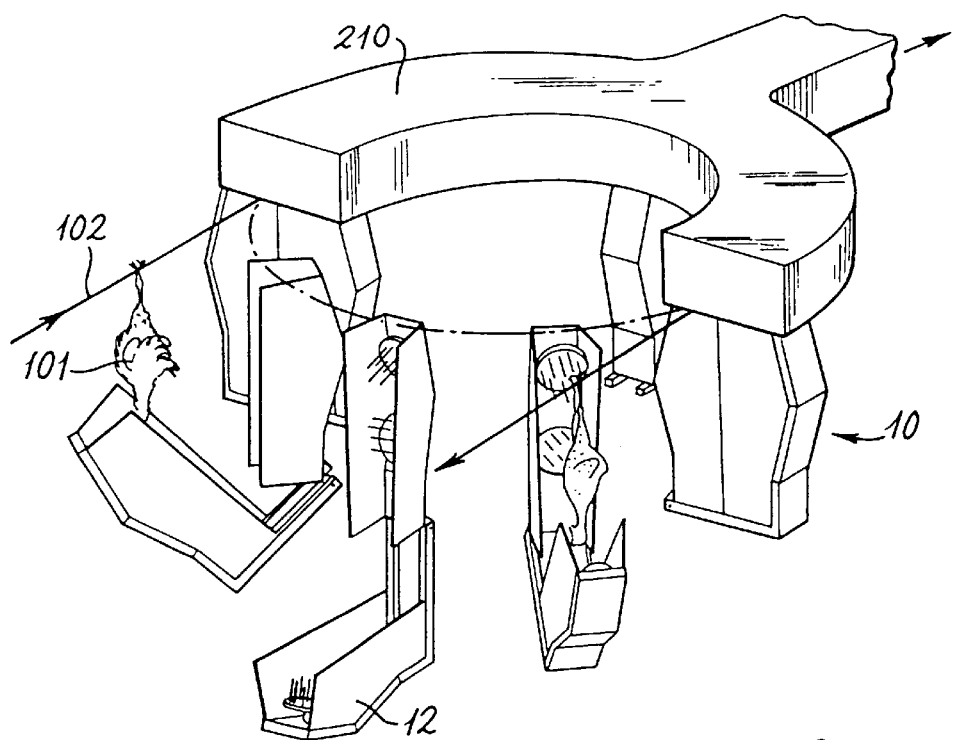

Returning now to FIG. 33, in the arrangement of FIG. 33a, the carcasses are enclosed in open-topped containers and the air/droplet mix is top-vented via an open bottomed extraction duct 210 using an appropriate extraction fan (not shown). In a variation (not shown), the containers are top-closed and open-bottomed and the extraction duct is relocated beneath the containers. In modifications of both these two possible arrangements, the extractor fan is replaced by a compressor which expels the air/droplet mix into another venting ducting located on the other side of the containers i.e. beneath (in the FIG. 33a version) or above (in the variation). When a venting or extraction duct is located beneath the containers, then means are preferably provided to separate out the water and the feathers both of which will be extracted by the underneath duct.

Figure 33B:
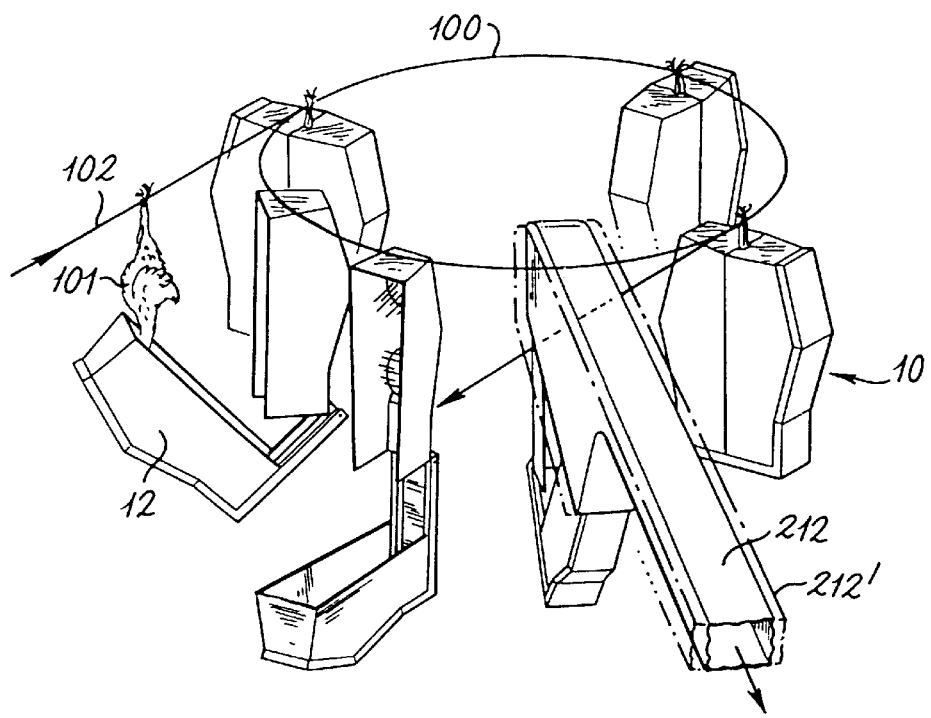

In the arrangement of FIG. 33b, the containers will be closed or in effect closed at both the top and bottom during plucking and the air/droplet mix is only removed via the extractor hood 212 when the containers open up prior to carcass removal. In this embodiment, the hood 212 moves with each container over a part of its path before returning for the next container. Feathers and water may stay inside the containers until opening occurs or they may exit via a non-return valve e.g. in the form of an 'S' bend or polythene tubing normally kept sealed, during the plucking operation. In a modification, a wider, stationary, hood 212' is used in place of reciprocating hood 212.

Figure 33C:
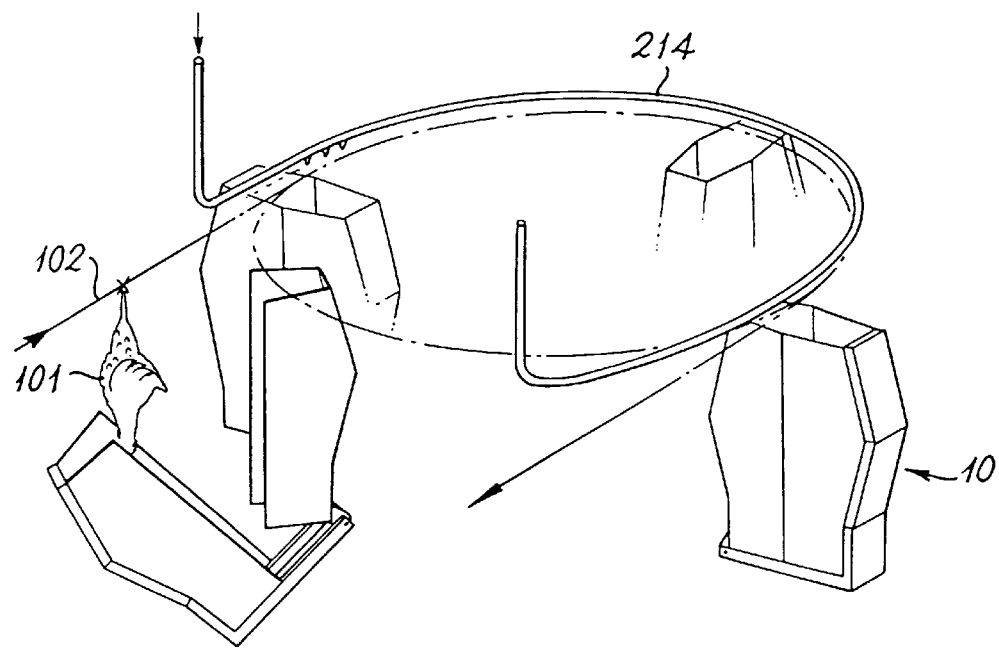

In the arrangement of FIG. 33c, a static high pressure water line 214 is fitted with appropriate nozzles to destroy the droplet 'mist' in the containers which is then extracted as described above. It is envisaged that the dribble bar may be omitted in this arrangement which could be used in combination with a hood as in the arrangement of FIG. 33b.

Figure 33D:
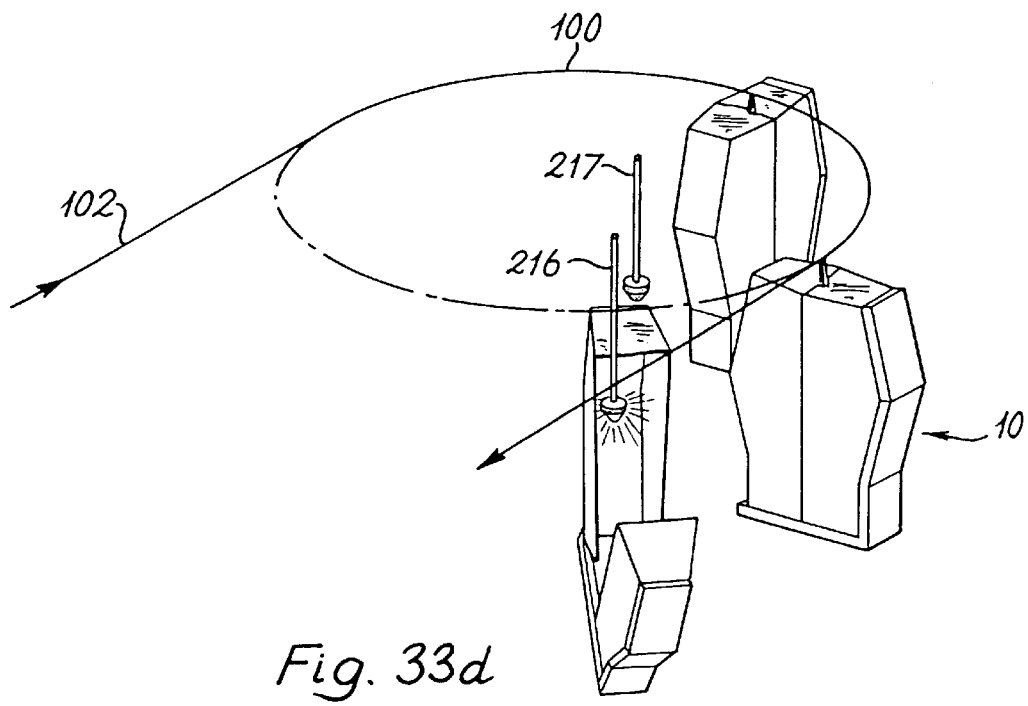

Finally, in the arrangement of FIG. 33d, the containers are once again closed or effectively closed during plucking but at the point where they open for carcass release lances 216, 217 will move up and down sequentially to enter and leave the containers as they pass through their opening point. Conveniently, the lances travel round with the containers e.g. like the spokes of a vertical wheel but, if desired, they could be stationary e.g. as in a smaller version of the FIG. 33c arrangement.

We claim:

1. Poultry processing equipment including:

a shackle line, a plurality of individual plucking units operatively positioned adjacent said shackle line, one for each of a number of carcasses to be plucked at any one time, each of said plurality of plucking units having plucking heads, shielding means for said plucking units whereby the plucking heads of each said unit are shielded from the plucking heads of the neighboring units during plucking, and means for cleaning each of the plucking units between successive plucking operations by that unit.

2. Poultry processing equipment as claimed in claim 1, in which the shackle line operates intermittently so that the carcasses may be plucked while temporarily halted in their forward motion through the apparatus.

3. Poultry processing equipment as claimed in claim 1 in which the shackle line operates continuously and drive means are provided to move the plucking units and the shielding means at the same speed as the carcasses during plucking.

4. Poultry processing equipment as claimed in any of claims 1 to 3 in which the direction of head rotation is such that adjacent heads rotate in contrary senses to one another.

5. Poultry processing equipment as claimed in claim 1, wherein the plucking heads are mounted on supports which provide little or no shielding and wherein said shielding means provides dedicated shielding separating adjacent plucking units.

6. Poultry processing equipment as claimed in claim 1 including supports for the plucking heads comprising bins which also serve as said shielding means, the bins being one of open-topped single-piece bins into which the birds are lowered, hinged bins which can open or close about a carcass, and two-part split bins where the two halves of the bin have no direct permanent connection between them and only come together to enclose the carcasses for plucking.

7. Poultry processing equipment as claimed in claim 6 in which the plucking heads are supported on a series of bins which move through the apparatus as a carousel system having a circular or other closed-loop path and in which the bins are hinged bins and the shackle line approaches as the closed-loop path moves along an intermediate section of said path, and then leaves said path, control means being provided firstly to ensure that the bins are open at entry and exit end regions of said intermediate section to allow passage of the carcasses into and out of the bins and secondly to ensure that the bins are maintained closed during their passage between said end regions during which time the carcasses are plucked by the plucking heads.

8. Poultry processing equipment as claimed in claim 6 in which the plucking heads are supported on the two halves of a series of split bins with the first and second halves of each bin moving along respective closed paths in a twin track system with the closed paths flanking opposite sides of the shackle line over an operative section of their journey in which plucking is to take place, the separation of the two paths at said operative section and the spacing apart of successive bin halves in each of the respective closed paths being so arranged that opposite halves of each of the different bins come together over said operative section to embrace carcasses suspended there from the shackle line.

9. Poultry processing equipment as claimed in claim 7 or claim 8 in which the bins are gapped bins, with each bin arranged so as at least in part to close up the gap in one of the neighbouring bins.

10. Poultry processing equipment as claimed in claim 1 in which the shielding means is provided by baffles and the plucking units may be displaced to move the plucking heads between, on the one hand, inter-shield operational plucking locations in which the plucking heads move with the carcasses and the baffles, and, on the other hand, withdrawal locations in which the individual plucking heads can be cleaned before their next plucking operation.

11. Poultry processing equipment as claimed in claim 1 including one of carousel and twin track systems for moving said plucking units in conjunction with a movement of said shackle line, and the plucking units have the plucking heads mounted only on opposite sides of the plucking space for the carcasses and in which plucking of the carcass sides, to get an overall treatment, is achieved by means causing relative movement between the plucking heads and the carcasses.

12. Poultry processing equipment as claimed in claim 1 in which the carcasses move through the processing equipment during plucking and the overall path of the shielding means through the equipment coincides with one of the path of the plucking units through the equipment and the path of the shackle line, through the equipment.

13. Poultry processing equipment as claimed in claim 1 including baffles to discourage carcass-to-carcass contamination and including means for continuously collecting and removing droplets from the system.

14. Poultry processing equipment as claimed in claim 1 in which the carcasses are wholly enclosed or effectively wholly enclosed to prevent droplets escaping and including means for extracting the droplets before the carcasses are released from their enclosures.

15. Plucking apparatus for plucking poultry carcasses on a shackle line including:

plurality of individual plucking units, one for each of a number of carcasses to be plucked at any one time, each one of said plurality of plucking units having plucking heads, and shielding means for said plucking units whereby the plucking heads of each of said unit are shielded from the plucking heads of the neighboring units during plucking.

16. A plurality of plucking units, each plucking unit including:

plucking heads;

shielding means for shielding the plucking heads of said unit from plucking heads of a neighboring unit during plucking; and a support for the plucking head comprising a bin, wherein the bin serves as said shielding means, the bin being one of an open-topped single-piece bin into which a carcass is lowered, a hinged bin which can open or close about the carcass, and a two-part split bin where the two halves of the bin have no direct permanent connection between them and only come together to enclose the carcass for plucking.

17. A plucking unit as claimed in claim 16 in which the plucking unit has plucking heads mounted only on opposite sides of the plucking space for the carcasses and in which plucking of the carcass sides, to get an overall treatment, is achieved by means causing relative movement between the plucking heads and the carcasses.

18. Plucking apparatus for plucking poultry carcasses including:

a shackle line and a plurality of individual plucking units operatively positioned adjacent the shackle line, one for each of a number of carcasses to be plucked at any one time, each of said plurality of plucking units having plucking heads, and shielding means for said plucking units whereby the plucking heads of each of said unit are shielded from the plucking heads of the neighboring units during plucking.

* * * * *